United States Patent
Yu

(10) Patent No.: US 12,146,560 B2
(45) Date of Patent: Nov. 19, 2024

(54) WAVE GENERATOR MANUFACTURED BY POWDER METALLURGY FOR HARMONIC REDUCER, STRAIN WAVE GEARING HAVING THE SAME, AND REDUCTION MOTOR ASSEMBLY HAVING THE SAME

(71) Applicant: Tung Pei Industrial Co., Ltd., Taipei (TW)

(72) Inventor: Wei-Kuei Yu, Taoyuan (TW)

(73) Assignee: Tung Pei Industrial Co., Ltd., Taipei (TW)

( * ) Notice: Subject to any disclaimer, the term of this patent is extended or adjusted under 35 U.S.C. 154(b) by 0 days.

(21) Appl. No.: 18/092,426

(22) Filed: Jan. 2, 2023

(65) Prior Publication Data

US 2024/0218923 A1    Jul. 4, 2024

(51) Int. Cl.
*F16H 49/00* (2006.01)
*B22F 5/00* (2006.01)

(52) U.S. Cl.
CPC .............. *F16H 49/001* (2013.01); *B22F 5/00* (2013.01); *F16H 2049/003* (2013.01)

(58) Field of Classification Search
CPC ............ F16H 49/001; F16H 2049/003; F16H 2049/006; B22F 3/11; B22F 5/00
See application file for complete search history.

(56) References Cited

U.S. PATENT DOCUMENTS

| 3,161,081 | A | * | 12/1964 | Walton | .................. | F16H 49/001 |
| | | | | | | 74/462 |
| 3,482,770 | A | * | 12/1969 | Nelson | .................. | B04B 1/2016 |
| | | | | | | 494/83 |
| 4,825,720 | A | * | 5/1989 | Capdepuy | .............. | H02K 7/116 |
| | | | | | | 74/468 |
| 9,470,301 | B2 | * | 10/2016 | Kuo | ....................... | F16H 49/001 |
| 11,015,650 | B2 | * | 5/2021 | Zhao | ....................... | F16C 33/64 |
| 11,285,601 | B2 | * | 3/2022 | Kataoka | .................. | F16H 55/17 |
| 2019/0368594 | A1 | * | 12/2019 | Sakata | ..................... | B25J 9/042 |

FOREIGN PATENT DOCUMENTS

| CN | 101908497 A | * | 12/2010 |
| CN | 106065925 A | * | 11/2016 | ............. | E21B 4/006 |
| CN | 106382351 A | * | 2/2017 | ........... | F16H 49/001 |

(Continued)

OTHER PUBLICATIONS

Machine translation of CN 111120619 A obtained on Jan. 23, 2024.*

(Continued)

*Primary Examiner* — Adam D Rogers
(74) *Attorney, Agent, or Firm* — Apex Juris, pllc; R. Lynette Wylie

(57) ABSTRACT

A wave generator suitable for a small-sized or medium-sized harmonic reducer, including a main body that is a porous structure manufactured by powder metallurgy and includes a central shaft and an elliptically shaped plug encirclingly disposed on a circumference of the central shaft. An outer diameter of the elliptically shaped plug is in a range of 25 mm to 72 mm. The wave generator has a strength enabling the wave generator to bear a torque less than or equal to 18 Nm that overcomes the technical bias so as to provide a wave generator manufactured by powder metallurgy capable of fulfilling the required harmonic reducer, thereby reducing the manufacturing cost.

9 Claims, 26 Drawing Sheets

(56) References Cited

FOREIGN PATENT DOCUMENTS

| CN | 110030358 A | * | 7/2019 | |
|---|---|---|---|---|
| CN | 111120619 A | * | 5/2020 | |
| CN | 114087338 A | | 2/2022 | |
| DE | 3840367 A1 | * | 5/1990 | |
| DE | 10245851 A1 | * | 4/2003 | ........... F16H 49/001 |
| DE | 102013225960 A1 | * | 6/2015 | ............. B62D 5/008 |
| JP | 5739713 B2 | | 6/2015 | |
| KR | 20090099202 A | * | 9/2009 | |
| KR | 200488753 Y1 | * | 7/2019 | |

OTHER PUBLICATIONS

Machine translation of CN 106065925 A obtained on Jan. 23, 2024.*
Machine translation of CN 101908497 A obtained on Jan. 24, 2024.*
Abstract for CN114087338A, total of 1 page.
Abstract for JP5739713B2, total of 1 page.

* cited by examiner

WAVE GENERATOR MANUFACTURED BY POWDER METALLURGY FOR HARMONIC REDUCER, STRAIN WAVE GEARING HAVING THE SAME, AND REDUCTION MOTOR ASSEMBLY HAVING THE SAME

BACKGROUND OF THE INVENTION

Technical Field

The present invention relates generally to a strain wave gearing and structures related to a harmonic reducer, and more particularly to a wave generator manufactured by powder metallurgy, a strain wave gearing having the same, and a reduction motor assembly having the same.

Description of Related Art

Since a load that is borne by a shaft for transmitting is equal to a product of an output force from a motor and reduction ratio, a conventional shaft for transmitting power has to be strong enough to prevent the shaft from being broken during operation. Therefore, except for the precise coaxiality and the uniform dimension, the conventional shaft for transmitting power is supposed to have high strength. In other words, the conventional shaft for transmitting power is constituted of a structure with great strength.

For the sake of safety and reliability, an input shaft and an output shaft of the strain wave gearing in the conventional motor is a structure having high strength. Such a shaft has a higher safety factor. Especially, as to a reducer applied in the field of aerospace, precision machinery, and electronic equipment, the reducer is required to have a high capability of bearing, a transmission accuracy, a transmission efficiency, so that such a reducer is more expansive than other reducers. In order to obtain a component having high strength, the component is manufactured by cutting a metal material via a CNC machine tool. Thus, the manufacturing cost of the conventional shaft or the conventional reducer is expensive.

BRIEF SUMMARY OF THE INVENTION

In view of the above, the primary objective of the present invention is to provide a wave generator for a harmonic reducer including a main body that is manufactured by powder metallurgy, which could fulfill the strength requirement of the input end of the harmonic reducer, thereby significantly saving manufacturing cost. The main body of the wave generator manufactured by powder metallurgy overcomes a technical bias that an input shaft and an output shaft of the reducer are required to have high strength.

The present inventive subject matter provides a wave generator manufactured by powder metallurgy, including a main body, which is a porous structure manufactured by powder metallurgy. The main body includes a central shaft and an elliptically shaped plug that is disposed on a circumference of the central shaft and surrounds the central shaft. An outer diameter of the elliptically shaped plug is in a range of 25 mm to 72 mm, and the strength of the main body allows the main body to bear a torque, which is less than or equal to 18 Nm.

The present inventive subject matter provides a strain wave gearing for a harmonic reducer, including a circular spline, a flex spline, and a wave generator. The circular spline has a plurality of internal teeth on an inner circumference. The flex spline includes a flexible wall and a side wall, wherein an outer circumference of the flexible wall has a plurality of external teeth. The plurality of external teeth is meshed with the plurality of internal teeth of the circular spline. The side wall is connected to an edge of the flexible wall. The wave generator includes a main body and a bearing, wherein the wave generator is a porous structure manufactured by powder metallurgy. The main body includes a central shaft and an elliptically shaped plug that is disposed on a circumference of the central shaft and surrounds the central shaft. An outer diameter of the elliptically shaped plug is in a range of 25 mm to 72 mm, and the strength of the main body allows the main body to bear a torque that is less than or equal to 18 Nm. The bearing is disposed on a circumference of the elliptically shaped plug. The bearing abuts against an inner circumference of the flexible wall.

The present inventive subject matter provides a reduction motor assembly of a harmonic reducer, including a motor and a strain wave gearing. The motor includes a motor housing and a stator, wherein two ends of the motor housing are respectively disposed with a front bearing bracket and a rear bearing bracket. A front bearing is embedded in the front bearing bracket, and a rear bearing is embedded in the rear bearing bracket. The stator is fixed to an inner circumference of the motor housing. The strain wave gearing includes a circular spline, a flex spline, and a wave generator, wherein an inner circumference of the circular spline has a plurality of internal teeth. The flex spline includes a flexible wall and a side wall, wherein an outer circumference of the flexible wall has a plurality of external teeth. The plurality of external teeth is meshed with the plurality of internal teeth of the circular spline. The side wall is connected to an edge of the flexible wall. The wave generator includes a main body and a bearing, wherein the main body of the wave generator is a porous structure manufactured by powder metallurgy. The main body includes a central shaft and an elliptically shaped plug that is disposed on a circumference of the central shaft and surrounds the central shaft. An outer diameter of the elliptically shaped plug is in a range of 25 mm to 72 mm, and the strength of the main body allows the main body to bear a torque which is less than or equal to 18 Nm. The bearing is disposed on a circumference of the elliptically shaped plug. The bearing abuts against an inner circumference of the flexible wall. The central shaft is inserted into the motor and pivotally passes through the front bearing and the rear bearing. A portion of the circumference of the central shaft, which corresponds to the inner side of the stator, forms a rotor seat, and a rotor is engaged with the rotor seat.

According to various embodiments as described and claimed herein, after the bearing is engaged with the main body of the wave generator, the wave generator, the circular spline and the flex spline are assembled to form the strain wave gearing. Since the outer diameter of the elliptically shaped plug is in a range of 25 mm to 72 mm, the strain wave gearing could be assembled with a proper motor to obtain the reduction motor assembly that is proper for mounting in the small-sized or medium-sized device, such as a robotic arm. Moreover, since the strength of the main body of the wave generator is limited to a level of strength enabling the main body to bear the torque less than or equal to 18 Nm, the main body of the wave generator manufactured by powder metallurgy could be reliably and safely used in the reduction motor assembly. Therefore, a component of the reducer could be made by a cost-effective means, such as powder metallurgy, instead of cutting metal material via CNC machining. Moreover, the technical bias that the input shaft and the output shaft requiring high strength is overcome. The strain wave gearing provided in the present invention could thus be manufactured by powder metallurgy and fulfill the requirement of the harmonic reducer, thereby reducing the manufacturing cost and enhancing efficiency.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
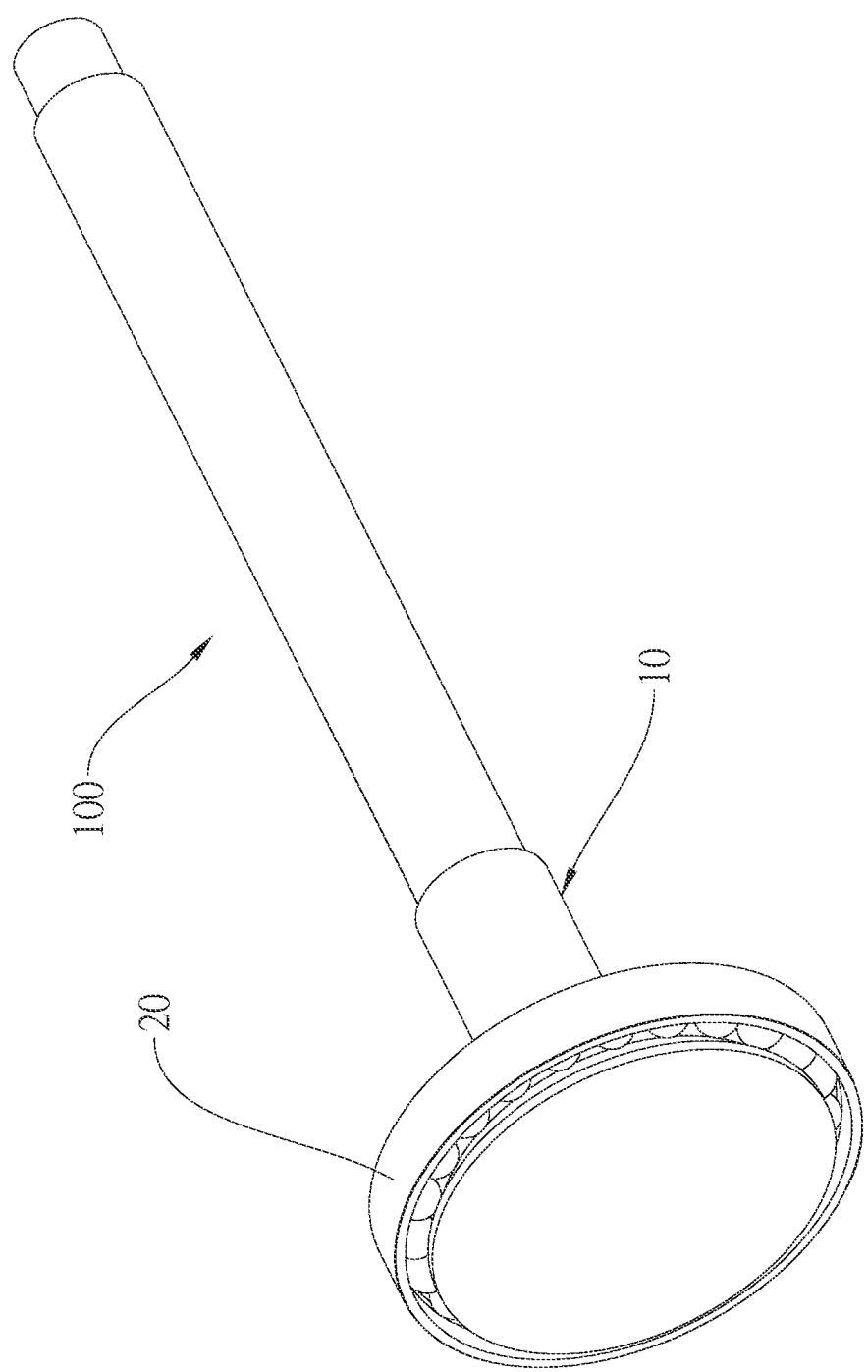
FIG. 1 is a perspective view of the wave generator of a first embodiment according to the present invention.
Figure 2:
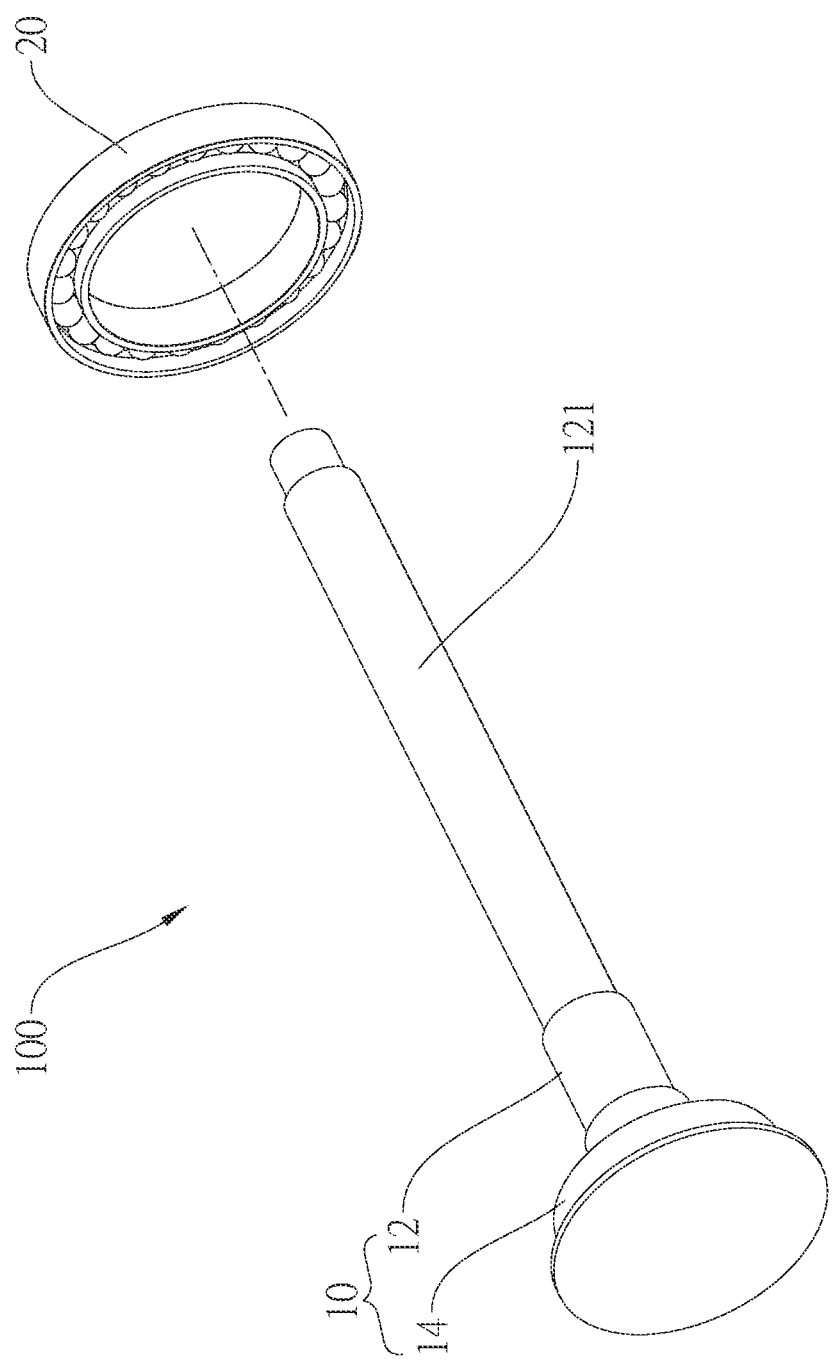
FIG. 2 is an exploded view of the wave generator of the first embodiment according to the present invention.
Figure 3:
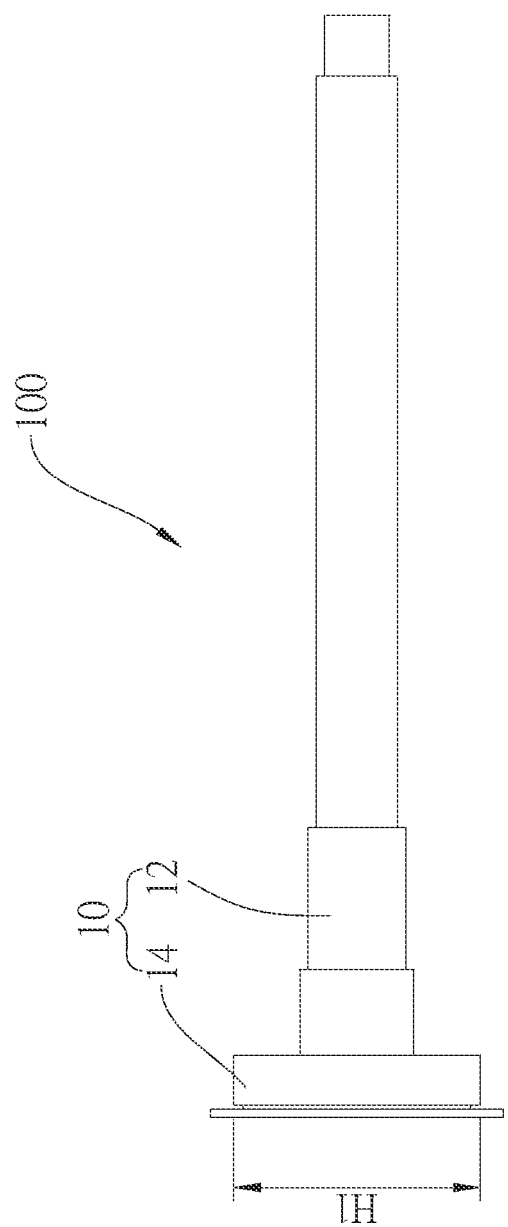
FIG. 3 is a side view of the main body of the wave generator in FIG. 2.
Figure 4:
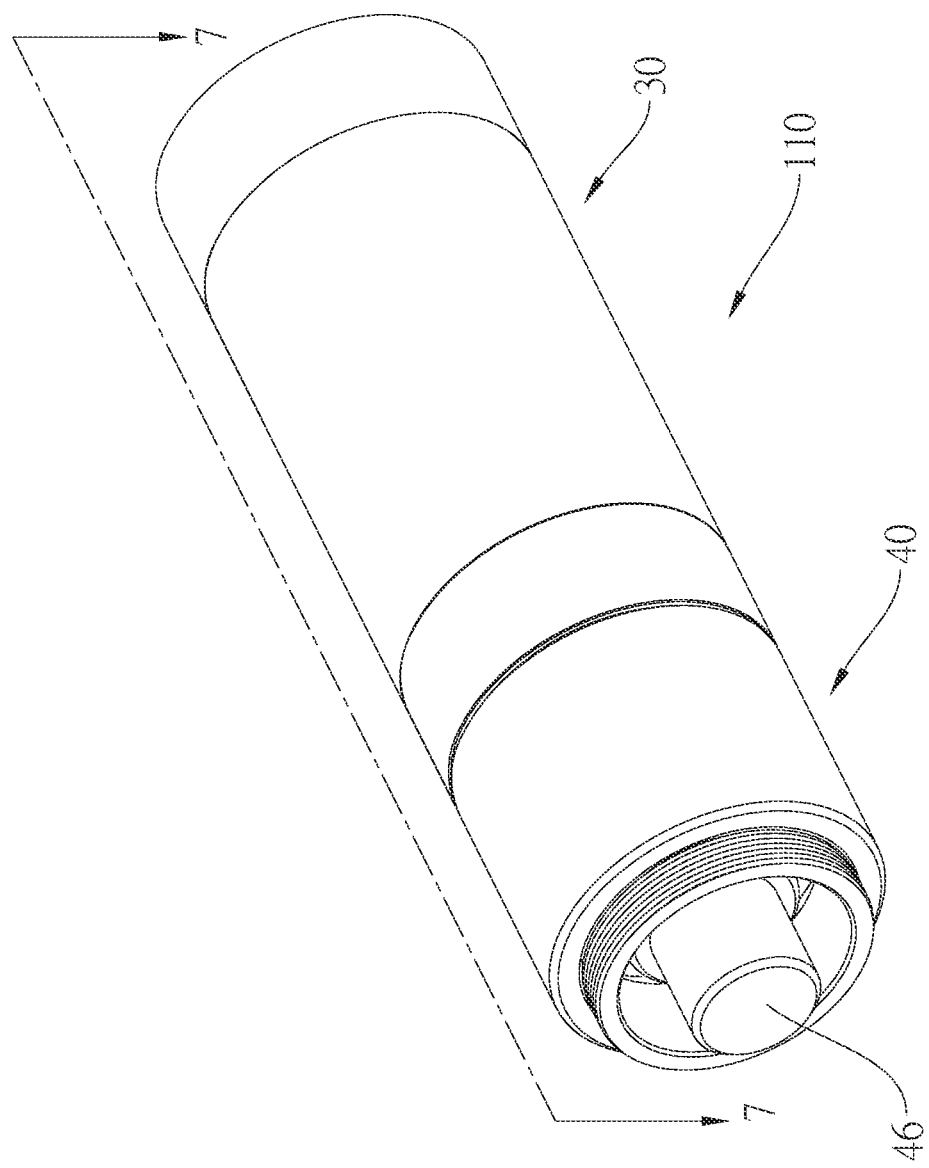
FIG. 4 is a perspective view of the reduction motor assembly with the wave generator of the first embodiment according to the present invention.
Figure 5:
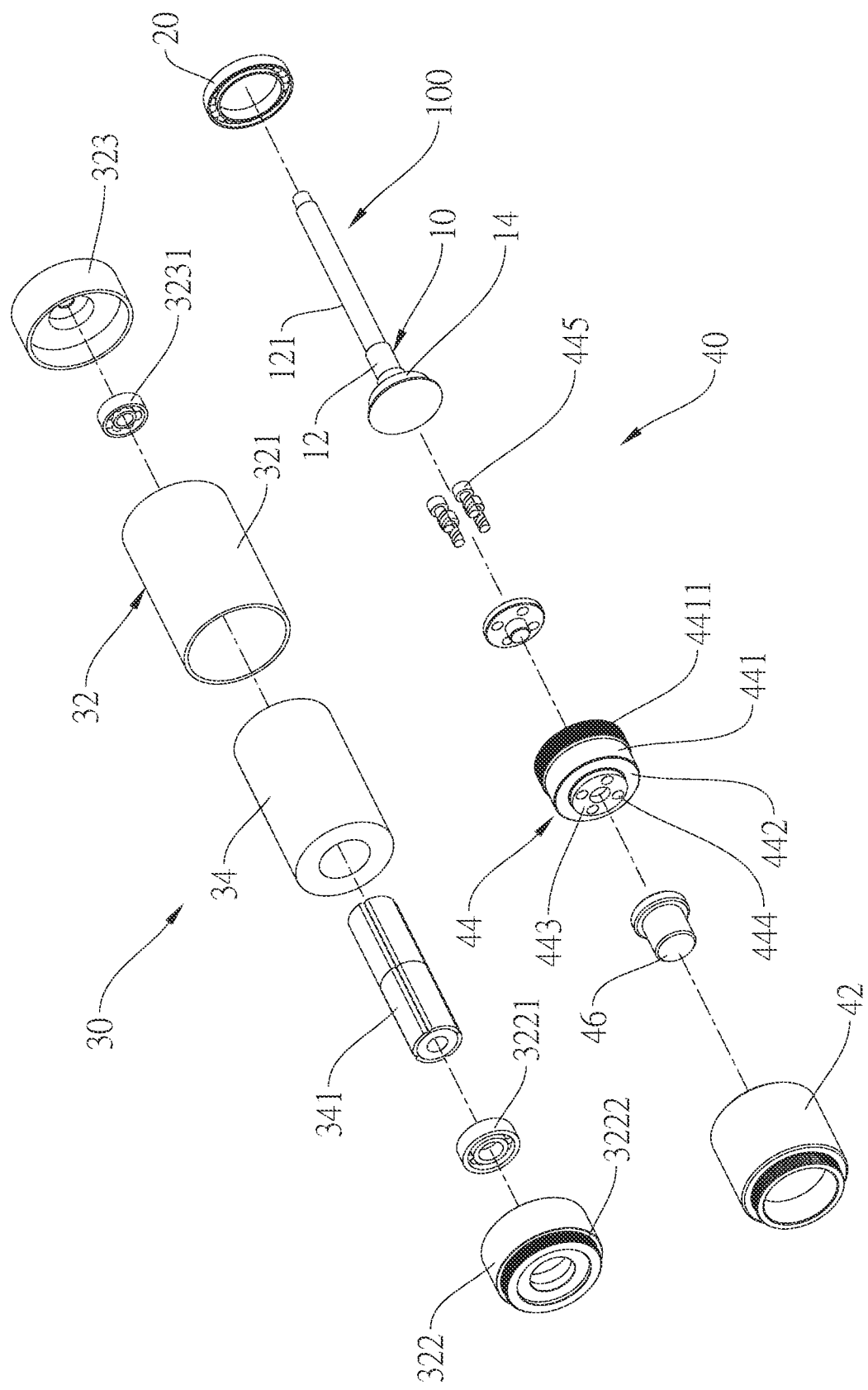
FIG. 5 is an exploded view of the reduction motor assembly in FIG. 4.
Figure 6:
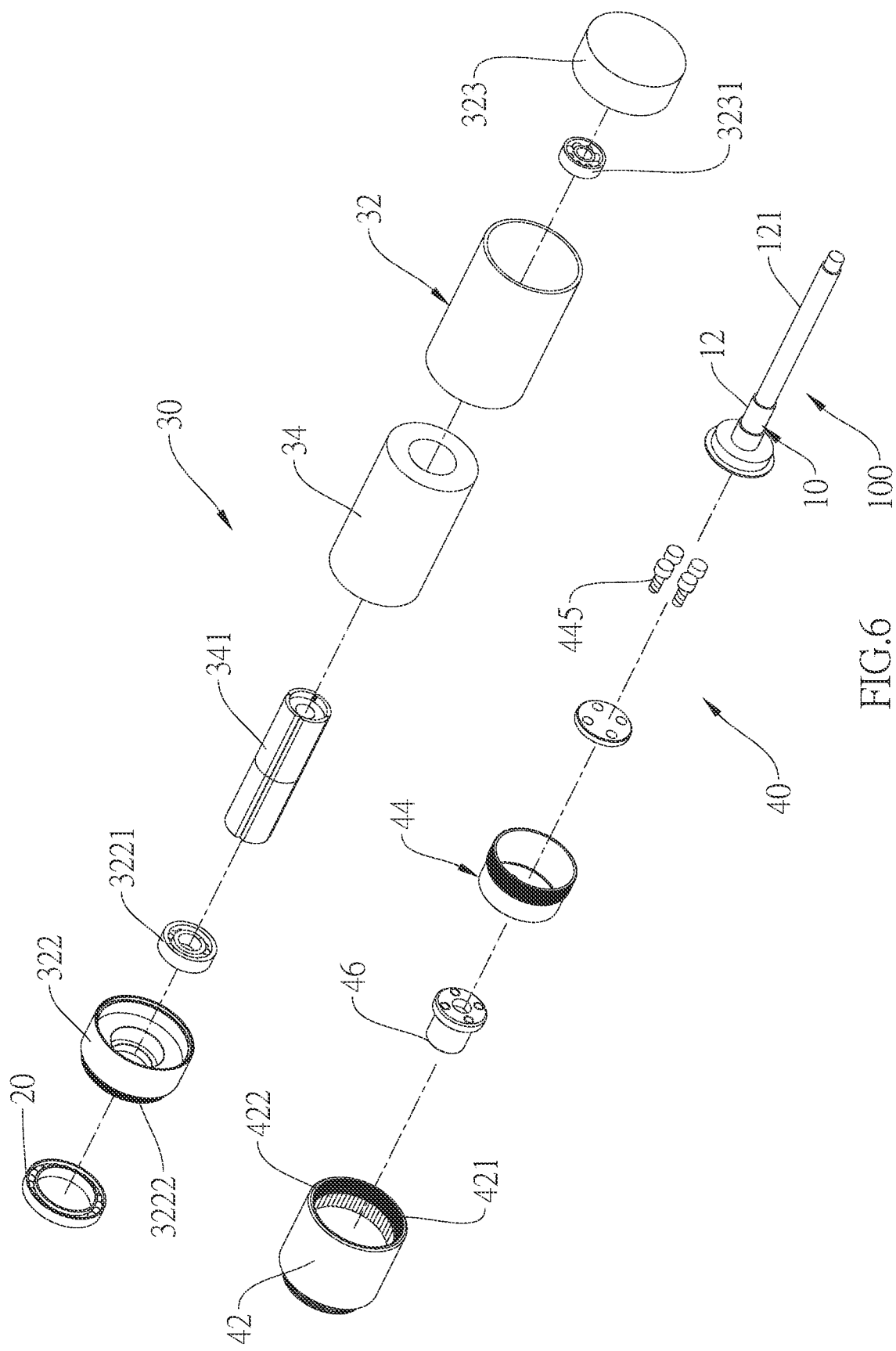
FIG. 6 is an exploded view of the reduction motor assembly in FIG. 4 seen from another perspective.
Figure 7:
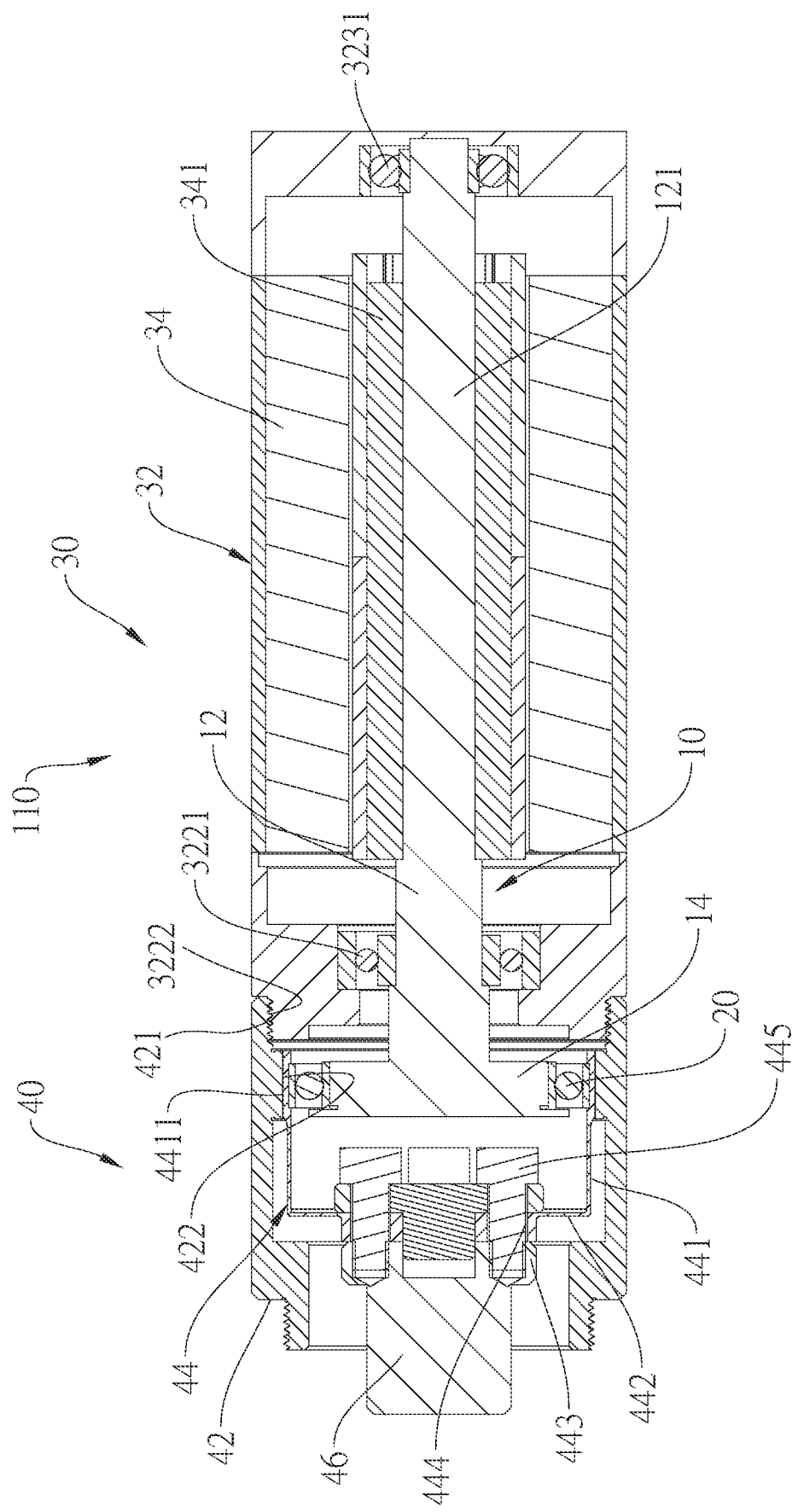
FIG. 7 is a sectional view taken along the 7-7 line in FIG. 4.

As illustrated in FIG. 1 to FIG. 3, a wave generator 100 of a first embodiment according to the present invention is applied to a strain wave gearing (so-called a harmonic drive), wherein the wave generator 100 is manufactured by powder metallurgy. The wave generator 100 includes a main body 10, wherein the main body 10 of the wave generator 100 is a porous structure that is manufactured by powder metallurgy. In the current embodiment, the main body 10 of the wave generator 100 is formed by sintering iron powder. The main body 10 of the wave generator 100 includes a central shaft 12 and an elliptically shaped plug 14, wherein the central shaft 12 is a straight rod body, and the elliptically shaped plug 14 is in an oval disc shape and is disposed on the central shaft 12 to surround a circumference of the central shaft 12. In the current embodiment, the elliptically shaped plug 14 is disposed at an end of the central shaft 12.

More specifically, the central shaft 12 is the straight rod body having a first end and a second end, wherein the elliptically shaped plug 14 is integrally connected to the first end of the central shaft 12 to surround the circumference of the central shaft 12. An outer diameter H1 of the elliptically shaped plug 14 is in a range of 25 mm to 72 mm. Based on a strength of the main body 10 of the wave generator 100, the torque that is exerted on or is applied to the main body 10 should not be greater than 18 Nm. In the current embodiment, a surface of the main body 10 of the wave generator 100 does not be treated to increase a hardness of the surface and strength by means of surface hardening, precipitation hardening, and other hardening methods. Additionally, the main body 10 of the wave generator 100 does not be heat treated to enhance mechanical properties. However, in other embodiments, the main body 10 of the wave generator 100 could be surface hardened and/or heat treated.

As illustrated in FIG. 2 and FIG. 4 to FIG. 7, when said wave generator 100 is mounted to a strain wave gearing 40, a bearing 20 is disposed around a circumference of the elliptically shaped plug 14. The strain wave gearing 40 is assembled to a motor 30 to form a reduction motor assembly 110. An outer diameter of the bearing 20 is in a range of 38 mm to 106 mm, which corresponds to the outer diameter of the elliptically shaped plug 14. The reduction motor assembly 110 includes the motor 30 and the strain wave gearing 40, wherein the motor 30 includes a motor housing 32, a stator 34, and a rotor 341. The motor housing 32 has a cylindrical body 321, wherein a front end of the cylindrical body 321 is disposed with a front bearing bracket 322, and a rear end of the cylindrical body 321 is disposed with a rear bearing bracket 323. A front bearing 3221 is embedded in the front bearing bracket 322, and a front end of a circumference of the front bearing bracket 322 forms an external screw thread 3222. A rear bearing 3231 is embedded in the rear bearing bracket 323, and the stator 34 is fixed to an inner circumference of the cylindrical body 321.

The strain wave gearing 40 is engaged with the front bearing bracket 32. The strain wave gearing 40 includes a circular spline 42, a flex spline 44, and the wave generator 100. The circular spline 42 is cylindrical, and a rear end of the inner circumference of the circular spline 42 has an internal screw thread 421. By screwing the internal screw thread 421 to the external screw thread 3222 of a front end of the motor 30. The circular spline 42 is a fixed end of the strain wave gearing 40, and a front end of the inner circumference of the circular spline 42 that is adjacent to the internal screw thread 421 has a plurality of internal teeth 422.

The flex spline 44 includes a flexible wall 441 and a side wall 442. The flexible wall 441 is an elastic and flexible ring-shaped body, wherein the flexible wall 441 is located at an inner side of the circular spline 42. An outer circumference of the flexible wall 441 has a plurality of external teeth 4411. The external teeth 4411 of the flex spline 44 are meshed with the internal teeth 422 of the circular spline 42. The side wall 442 is connected to a front end of the flexible wall 441. In the current embodiment, the flex spline 44 is in a cup shape. The side wall 442 is a circular plate, wherein an edge of the side wall 442 is attached to a front edge of the flexible wall 441. The side wall 442 has a connecting seat 443 in middle, wherein a thickness in an axial direction of the connecting seat 443 is greater than a thickness of the remaining portion of the side wall 442. The connecting seat 443 has a plurality of perforations 444, wherein the perforations 444 are arranged and spaced along a circumferential direction of the connecting seat 443.

The wave generator 100 includes the main body 10 and the bearing 20, wherein the bearing 20 abuts against an inner circumference of the flexible wall 441. The central shaft 12 of the main body 10 of the wave generator 100 is inserted into the motor 30 and pivotally passes through the front bearing 3221 and the rear bearing 3231. A circumference of a portion of the central shaft 12 which corresponds to the inner side of the stator 34 forms a rotor seat 121. The rotor 341 is engaged with the rotor seat 121 of the central shaft 12 to fix. The central shaft 12 of the main body 10 of the wave generator 100 is an input end of the strain wave gearing 40. Each of the perforations 444 is passed through by one of a plurality of screws 445. After each of the screws 445 passes through one of the perforations 444, the screws 445 are screwed into a shaft 46, wherein the shaft 46 is an output end of the strain wave gearing 40.

As illustrated in FIG. 3, and FIG. 4 to FIG. 7, since the outer diameter of the elliptically shaped plug 14 is in a range of 25 mm to 72 mm, the strain wave gearing 40 with said wave generator 100 is applied to a small-sized and medium-sized strain wave gearing. The motor 30 for being assembled to the strain wave gearing 40 is small-sized or medium-sized as well. An outer diameter of the central shaft 12 of the elliptically shaped plug 14 is smaller than 20 mm, wherein the central shaft 12 of the elliptically shaped plug 14 is a shaft of the motor 30 as well, so that the central shaft 12 of the wave generator 100 and the motor 30 could compatibly work together. With such design, the strain wave gearing 40 could be assembled to the motor 30 to obtain the reduction motor assembly that could be applied in the field of aerospace, precision machinery, and electronic equipment, such as the reduction motor assembly 110 for the robotic arm. Generally, a minimum of the torque load of the drive output of the reduction motor assembly 110 for the precision machinery is lower than tens of newton-meter or hundreds of newton-meter. Since the harmonic strain wave gearing could reduce the rotational speed over ten times, even hundreds of times. In general, the planetary gear reducer could merely reduce the speed ten times or less than ten times. Compared with the planetary gear reducer, the harmonic strain wave gearing has a high reduction ratio, so that the requirement for the strength of torque of the input end of the strain wave gearing 40 could be significantly lower, less than 18 Nm. In other words, as long as the strength of the strain wave gearing 40 could allow the strain wave gearing 40 to bear 18 Nm torque, the strain wave gearing 40 could operate normally.

In general idea, during transmission, the reducer needs to bear the high load, so that the input shaft and the output shaft of the reducer are usually made from a material having high rigidity. Therefore, since the harmonic reducer is usually applied to the field of aerospace, electronic equipment, and other precision machinery, the wave generator of the conventional harmonic reducer is manufactured by utilizing a CNC machine tool to cut a metal material. The conventional manufacturing method is expensive, so that the cost of the conventional wave generator is expensive as well. However, no one assesses whether the rigid component with such a high safety factor, which is far more than the safety requirement of using, is necessary or not. In the present invention, the main body 10 of the wave generator 100 is manufactured by powder metallurgy, and the outer diameter of the elliptically shaped plug 14 of the main body 10 is restricted in a range between 25 mm and 72 mm. In such a situation, the strength of the structure formed by powder metallurgy allows the structure to bear torque that is equal to or smaller than 18 Nm. Even a surface of the structure formed by powder metallurgy does not be specially treated by heat to increase its strength, the strength of the structure allows the structure to bear the torque load under normal operation. Thus, the technical bias that the input end (such as the wave generator 100) of the reducer could merely utilize the component at least having a strength equal to the strength of the structure manufactured by metal cutting is overcome. By using powder metallurgy, the manufacturing cost is significantly reduced and the yield is enhanced.

As to the reduction motor assembly 110 having the wave generator 100, since the central shaft 12 of the strain wave gearing 40 is simultaneously an output shaft of the motor 30, the strain wave gearing 40 is directly engaged with the motor 30 without using a converter. With such a design, the rigidity of the main body 10 of the wave generator 100, which is manufactured by powder metallurgy, could be enhanced. Simultaneously, the entire length in an axial direction of the reduction motor assembly 110 could be reduced and compacted, so that the reduction motor assembly 110 with a smaller size could be mounted into a smaller space for driving the device with a smaller inner space, such as a smaller robotic arm. Additionally, since the main body 10 of the wave generator 100 is manufactured by powder metallurgy, the manufacturing cost of the reduction motor assembly 110 and the strain wave gearing 40 could be saved, and the production rate thereof could be promoted, thereby increasing economic benefits.

Figure 8:
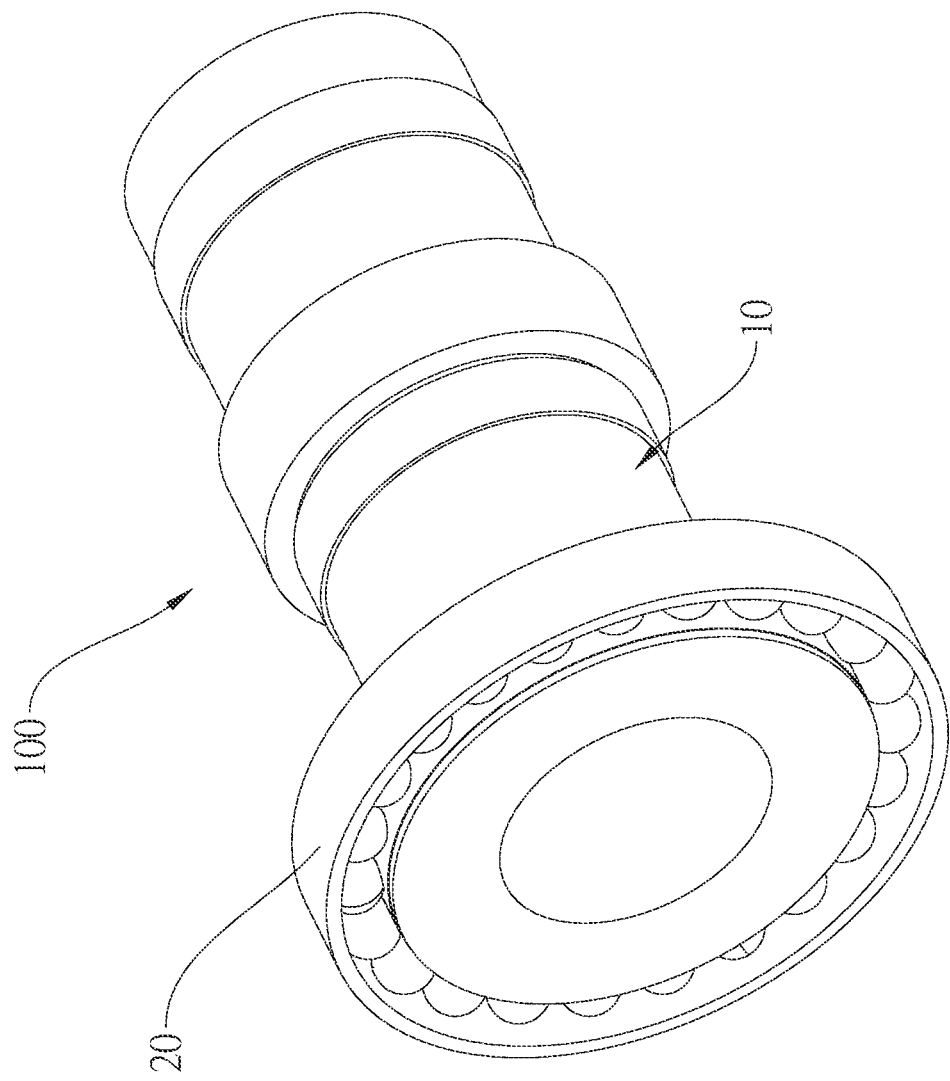
FIG. 8 is a perspective view of the wave generator of a second embodiment according to the present invention.
Figure 9:
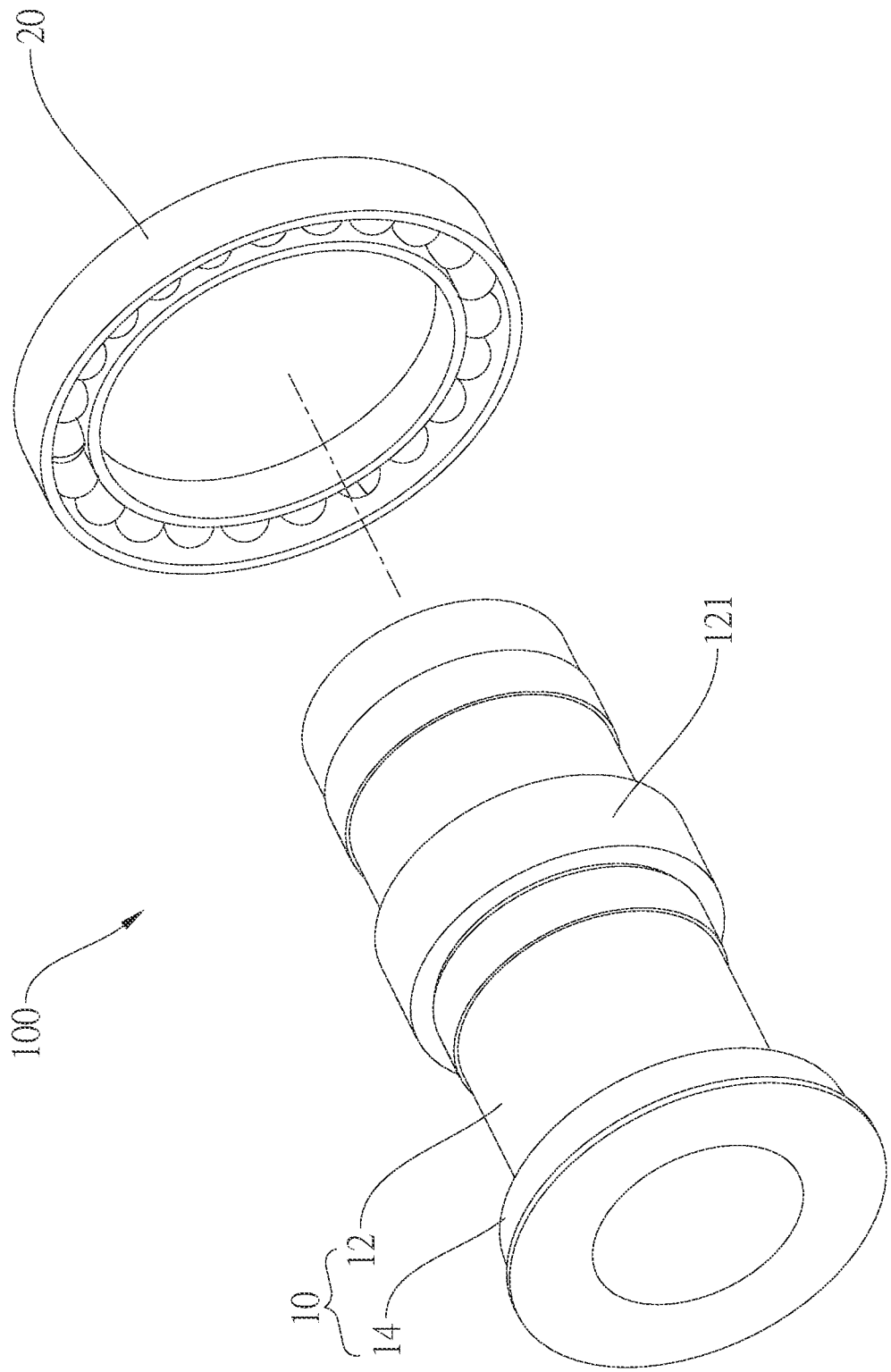
FIG. 9 is an exploded view of the wave generator of the second embodiment according to the present invention.
Figure 10:
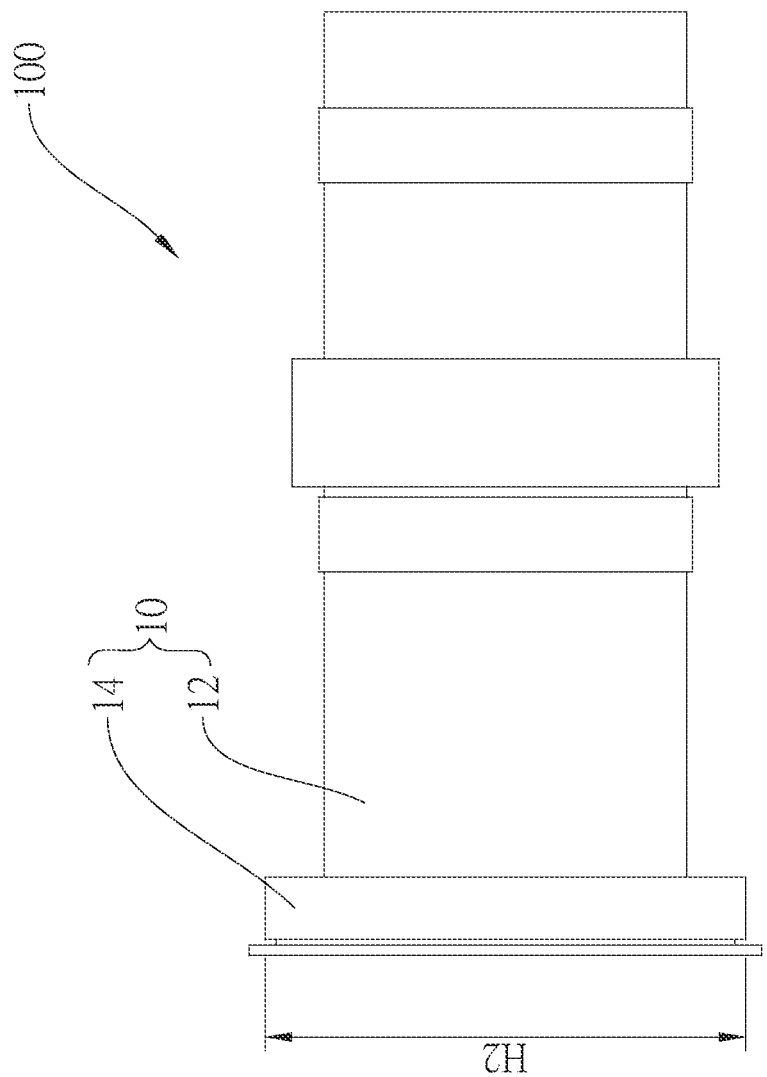
FIG. 10 is a side view of the main body of the wave generator in FIG. 9.
Figure 11:
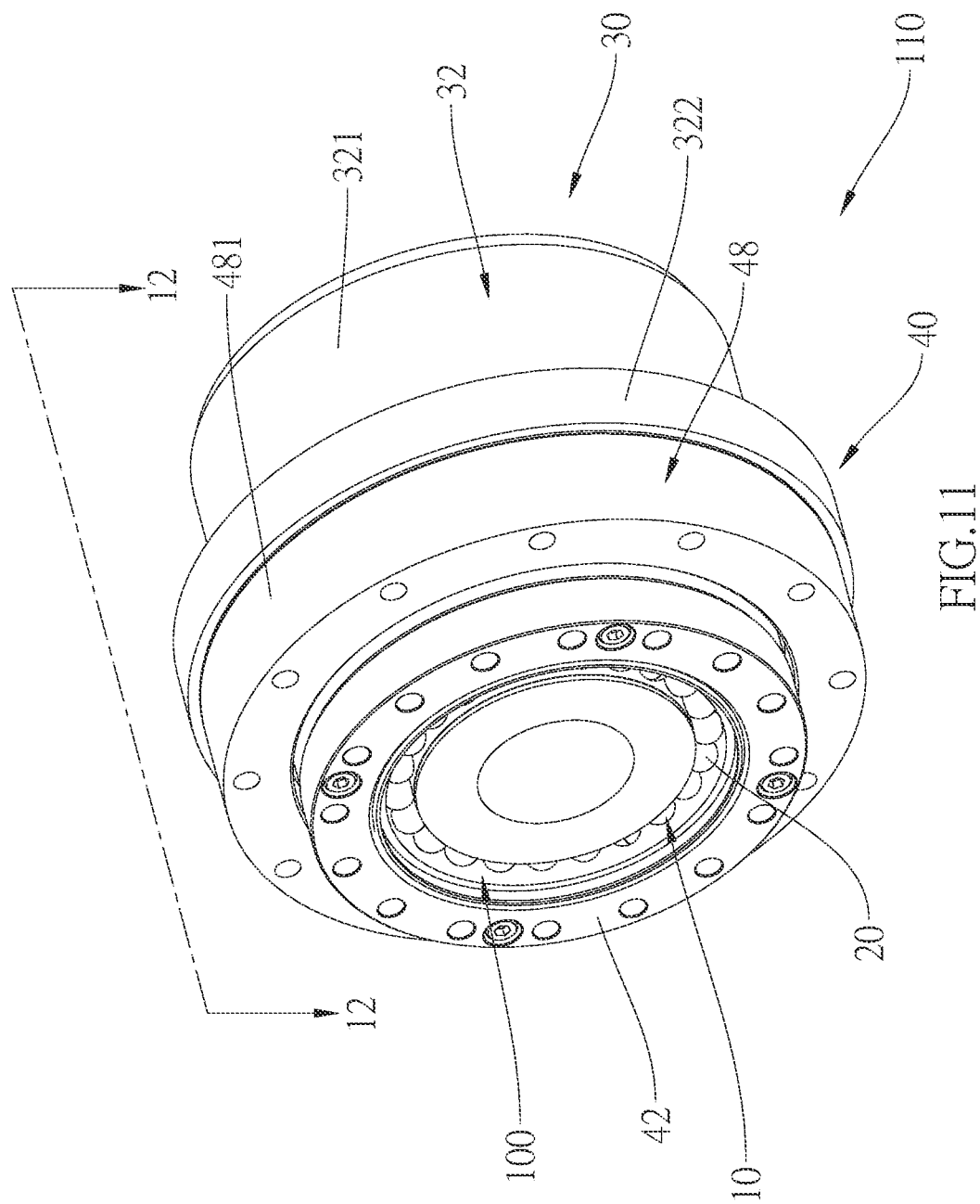
FIG. 11 is a perspective view of the reduction motor assembly with the wave generator of the second embodiment according to the present invention.
Figure 12:
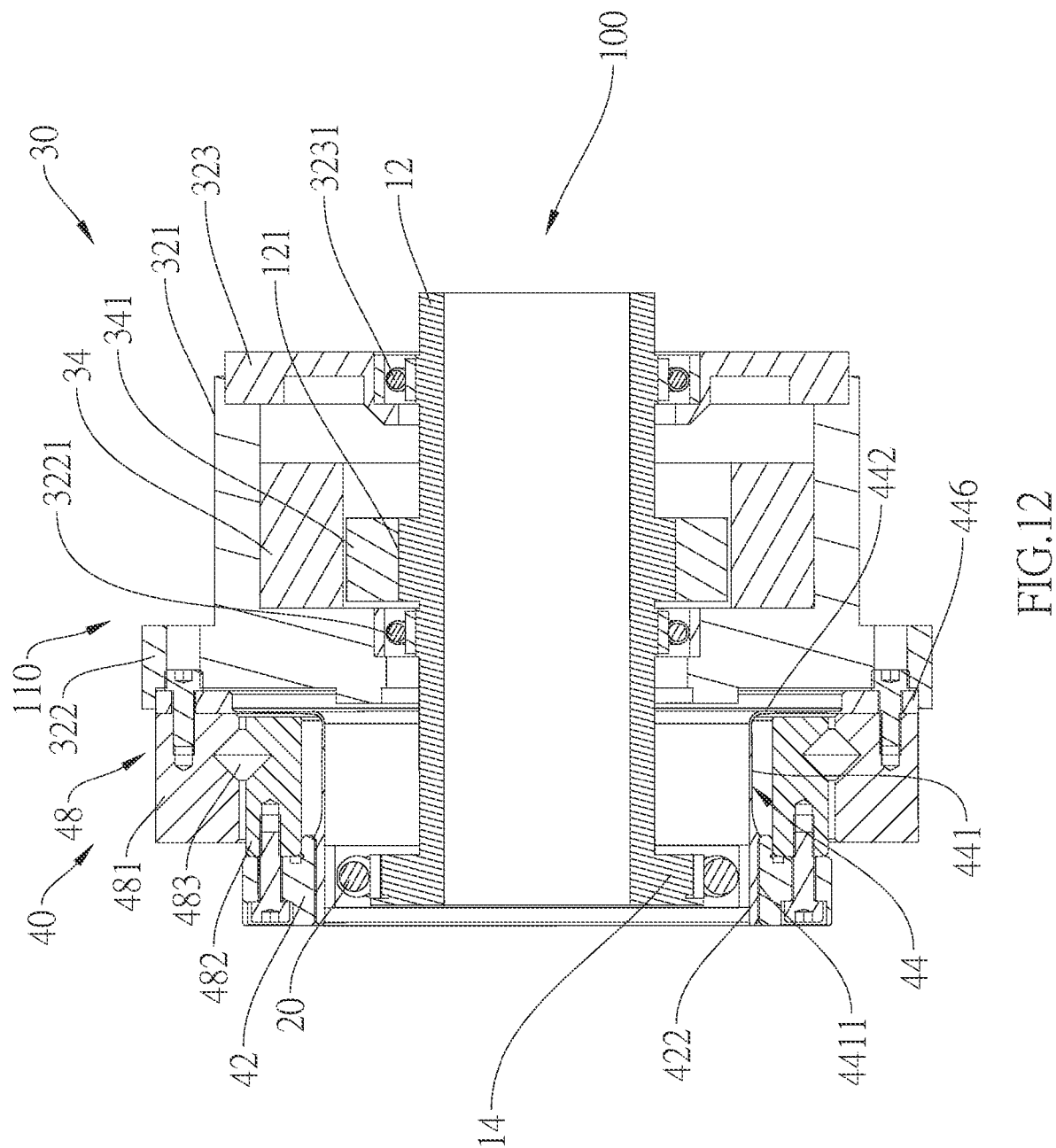
FIG. 12 is a sectional view taken along the 12-12 line in FIG. 11.
Figure 13:
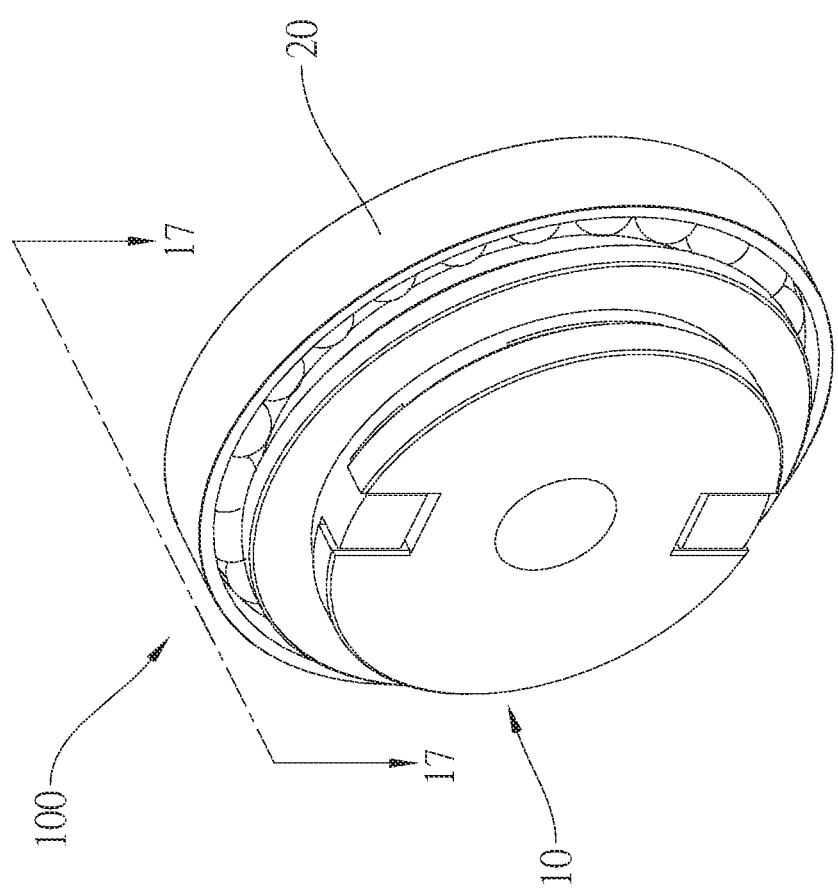
FIG. 13 is a perspective view of the wave generator of a third embodiment according to the present invention.
Figure 14:
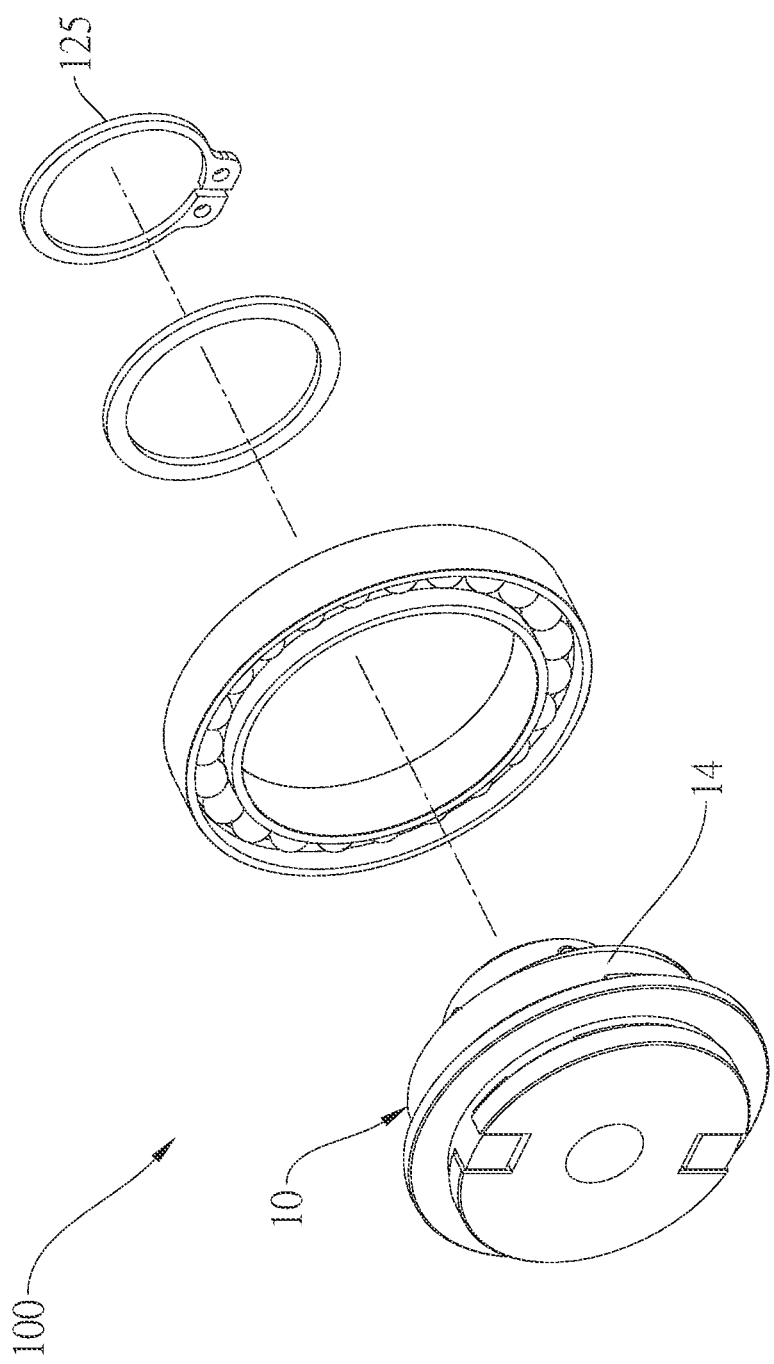
FIG. 14 is an exploded view of the wave generator of the third embodiment according to the present invention.
Figure 15:
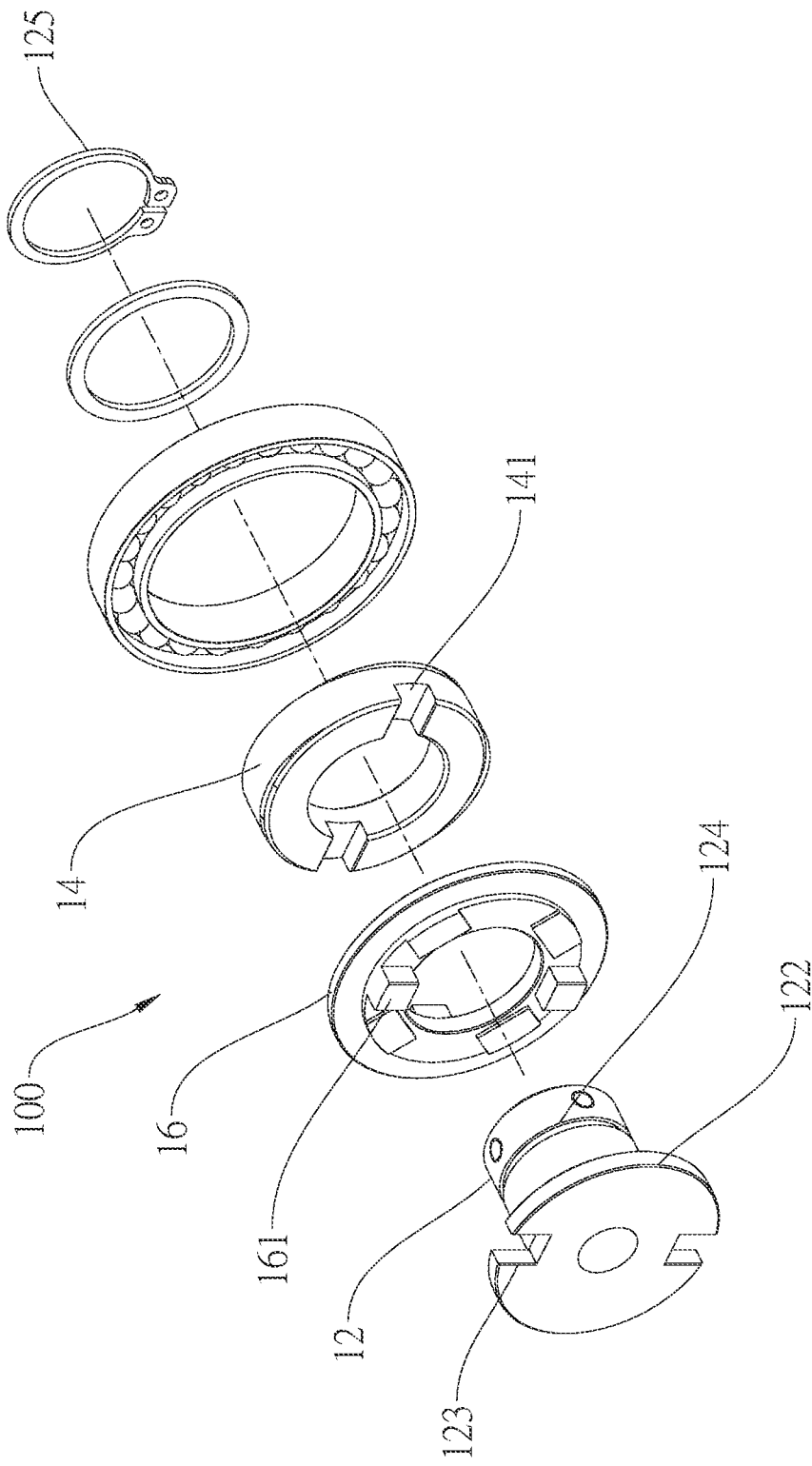
FIG. 15 is an exploded view of the main body of the wave generator in FIG. 14.
Figure 16:
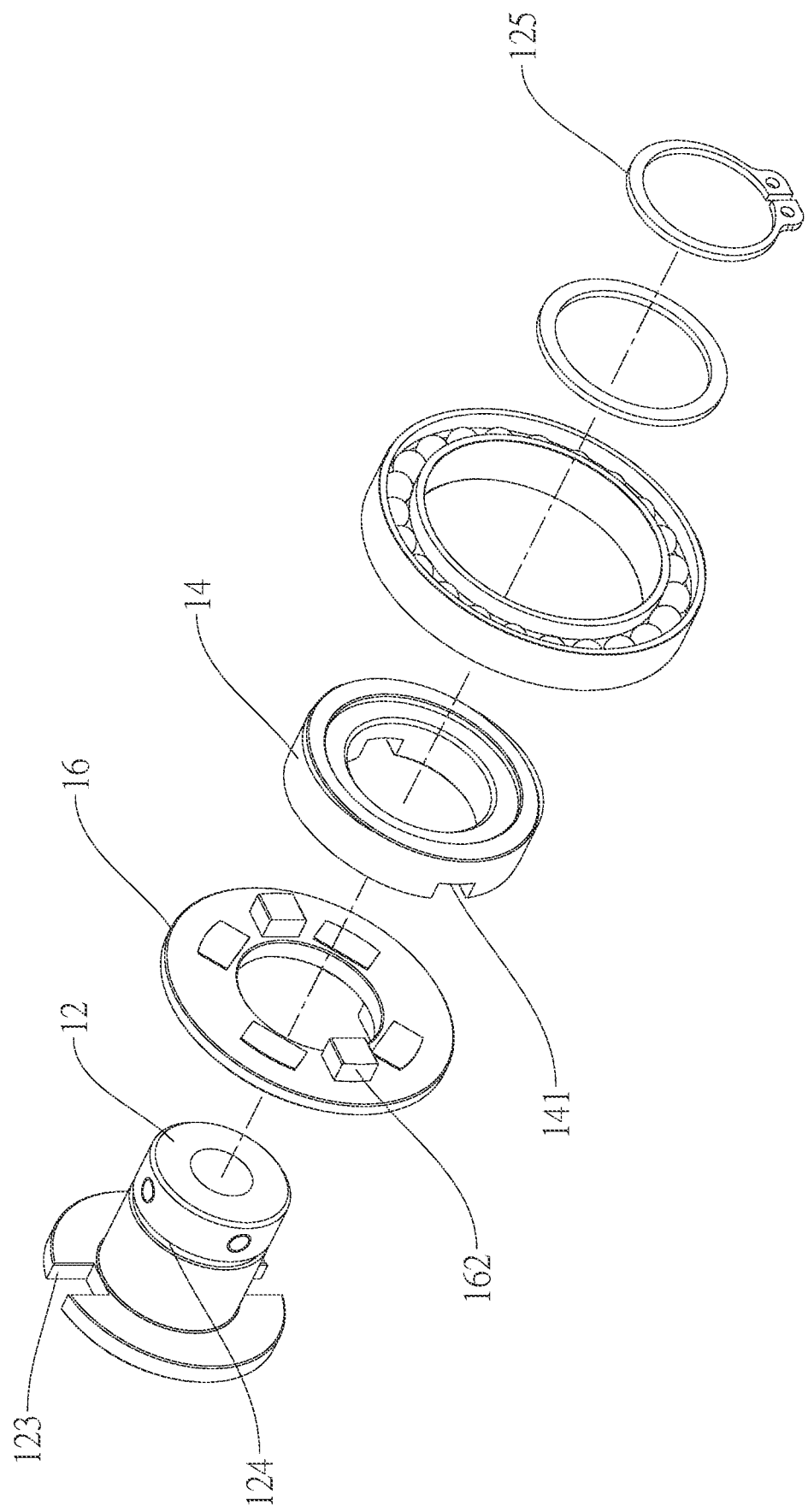
FIG. 16 is an exploded view of the main body of the wave generator in FIG. 14 seen from another perspective.
Figure 17:
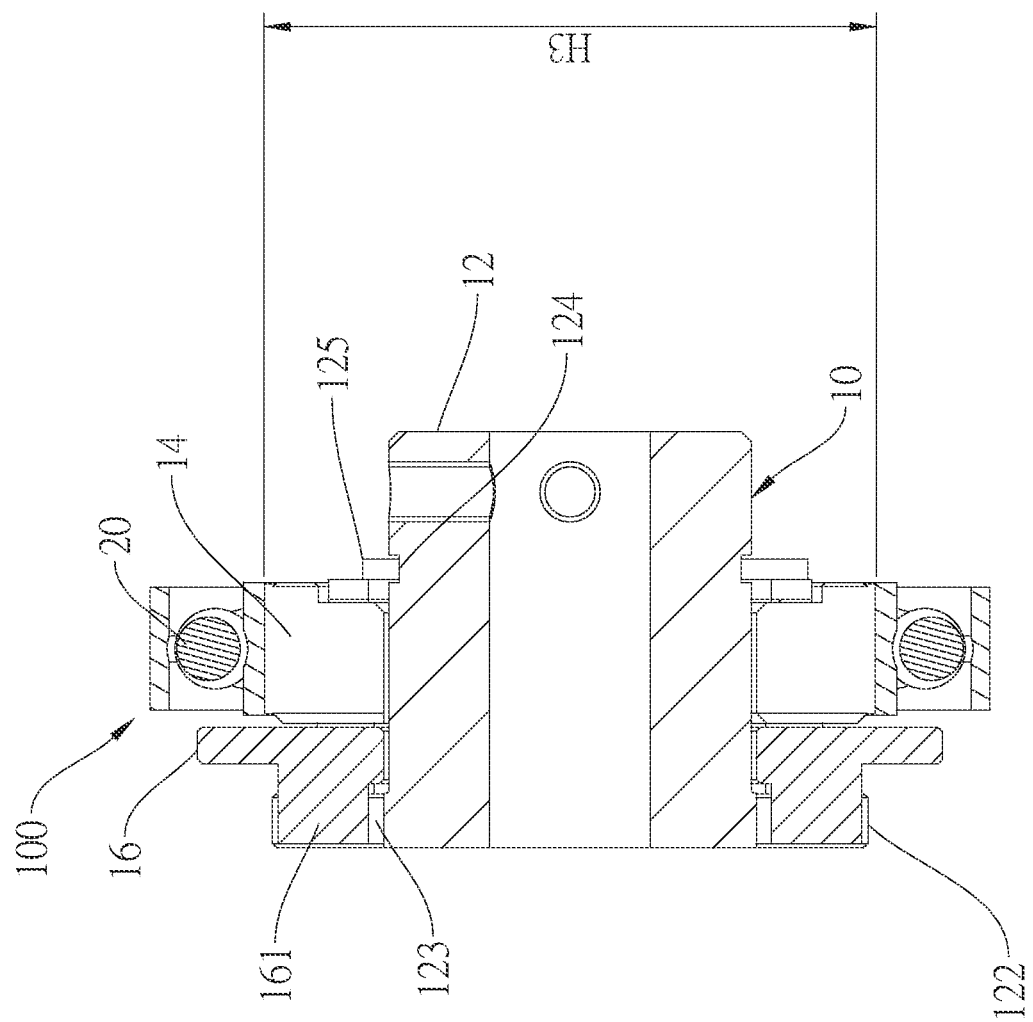
FIG. 17 is a sectional view taken along the 17-17 line in FIG. 13.
Figure 18:
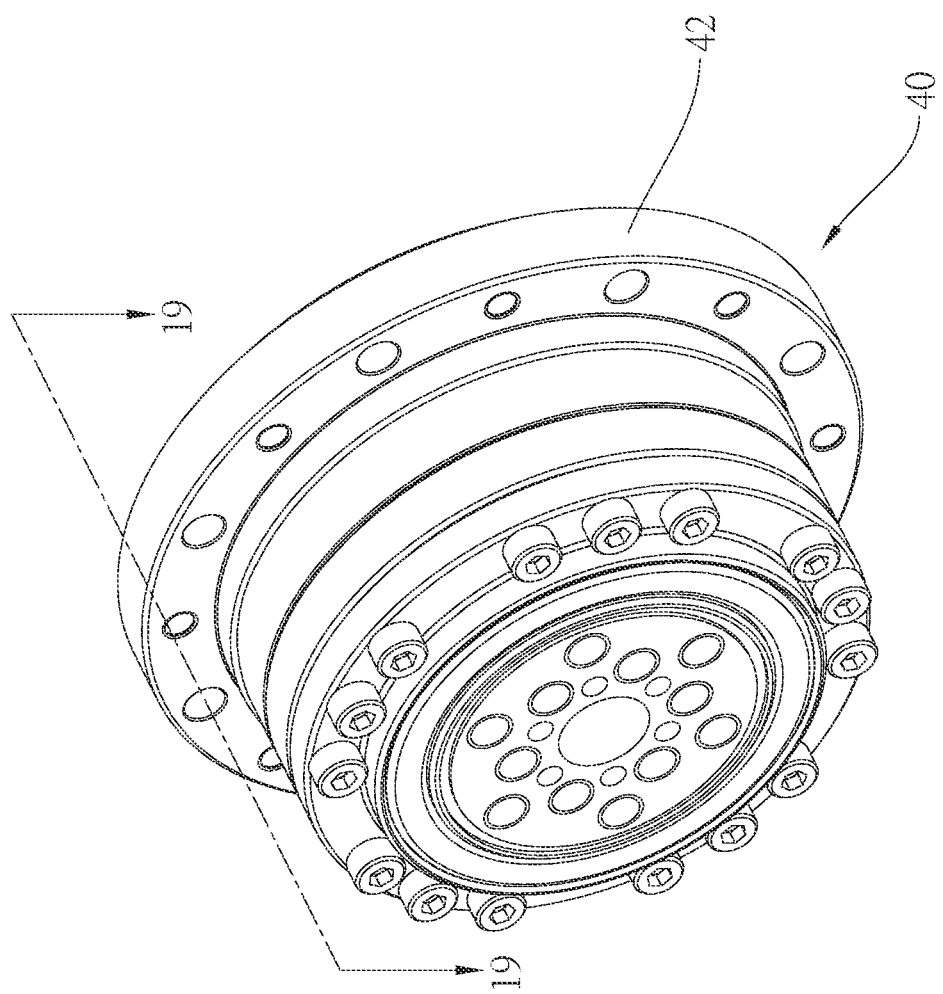
FIG. 18 is a perspective view of the reduction motor assembly with the wave generator of the third embodiment according to the present invention.
Figure 19:
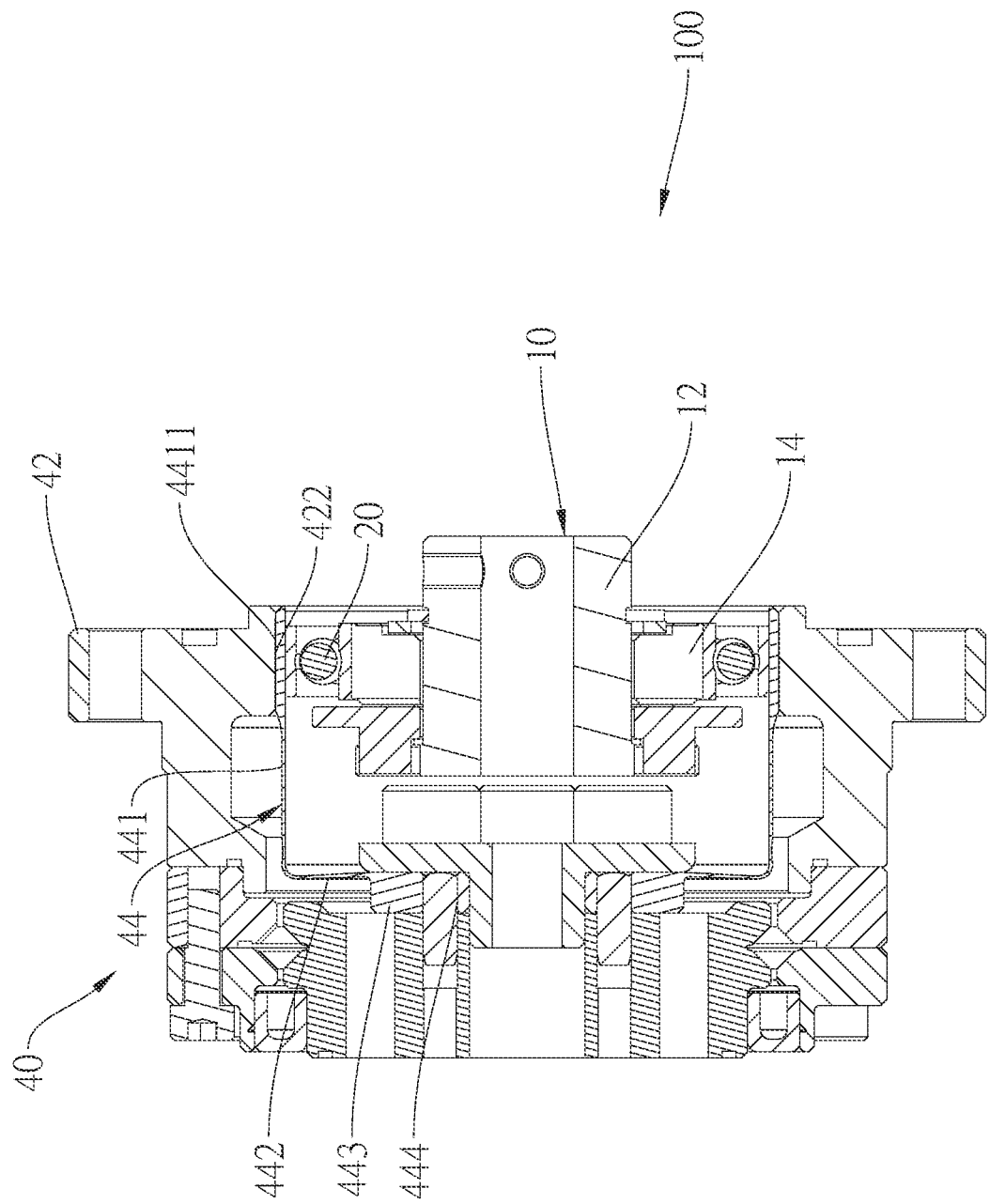
FIG. 19 is a sectional view taken along the 19-19 line in FIG. 18.

As illustrated in FIG. 8 to FIG. 10, a wave generator 100 of a second embodiment according to the present invention is applied to a strain wave gearing (so-called a harmonic drive). Similar to the wave generator 100 of the first embodiment, the wave generator 200 of the second embodiment includes a main body 10. The main body 10 of the wave generator 200 of the second embodiment is a porous structure that is manufactured by the powder metallurgy, wherein the main body 10 includes a central shaft 12 and an elliptically shaped plug 14. The central shaft 12 is a hollowed shaft having a first end and a second end, wherein the elliptically shaped plug 14 is integrally connected to the first end of the central shaft 12 to surround the circumference of the central shaft 12. An outer diameter H2 of the elliptically shaped plug 14 of the main body 10 of the wave generator 100 of the second embodiment is in a range of 25 mm to 72 mm. The strength of the main body 10 of the wave generator 100 could allow the main body 10 to bear 18 Nm torque, the main body 10 could transmit or bear the torque less than or equal to 18 Nm.

As illustrated in FIG. 8 to FIG. 12, the wave generator 100 of the second embodiment is mounted in the strain wave gearing, a circumference of the elliptically shaped plug 14 is surrounded by a bearing 20. Then, the strain wave gearing is assembled to a motor 30 to form a reduction motor assembly 110. The reduction motor assembly 110 includes a motor 30 and a strain wave gearing 40. The motor 30 includes a motor housing 32, a stator 34, and a rotor 341. The motor housing 32 has a cylindrical body 321 in a circular-tube shape, wherein a front end of the cylindrical body 321 is disposed with a front bearing bracket 322, and a rear end of the cylindrical body 321 is disposed with a rear bearing bracket 323. A front bearing 3221 is embedded in the front bearing bracket 322, and a front end of a circumference of the front bearing bracket 322 forms an external screw thread 3222. A rear bearing 3231 is embedded in the rear bearing bracket 323, and the stator 34 is fixed to an inner circumference of the cylindrical body 321.

The strain wave gearing 40 is engaged with the front bearing bracket 322. The strain wave gearing 40 includes a circular spline 42, a flex spline 44, and the wave generator 100 of the second embodiment. The circular spline 42 is cylindrical, and the inner circumference of the circular spline 42 has a plurality of internal teeth 422. The circular spline 42 is spaced from and located at a front side of the front bearing bracket 322. The circular spline 42 is an output end of the strain wave gearing 40. The flex spline 44 is in a hat shape and includes a flexible wall 441 and a side wall 442. The flexible wall 441 is an elastic and flexible ring-shaped body, wherein the flexible wall 441 is located at an inner side of the circular spline 42. An outer circumference of the flexible wall 441 has a plurality of external teeth 4411. The external teeth 4411 of the flex spline 44 are meshed with the internal teeth 422 of the circular spline 42. The side wall 442 is a circular plate, wherein an inner edge of the side wall 442 is attached to a rear edge of the flexible wall 44. An outer edge of the side wall 442 has a connecting portion 446, wherein a rear surface of the connecting portion 446 is engaged with an edge of a front end surface of the front bearing bracket 322. The connecting portion 446 is a fixed end of the strain wave gearing 40 of the second embodiment.

The cross roller bearing 48 is disposed between the side wall 442 and the circular spline 42. The cross roller bearing 48 includes an outer ring 481, an inner ring 482, and a plurality of rollers 483, wherein the rollers 483 are disposed between the outer ring 481 and the inner ring 482. The outer ring 481 is engaged with a front side of the connecting portion 446, and the inner ring 482 is engaged with a rear side of the circular spline 42. The wave generator 100 includes the main body 10 and the bearing 20, wherein the bearing 20 abuts against the inner circumference of the flexible wall 441. The central shaft 12 of the main body 10 of the wave generator 100 is inserted into the motor 30 and pivotally passes through the front bearing 3221 and the rear bearing 3231. A circumference of a portion of the central shaft 12, which corresponds to the inner side of the stator 34, forms a flange as a rotor seat 121. The rotor 341 is engaged with the rotor seat 121 of the central shaft 12 to fix. The central shaft 12 of the main body 10 of the wave generator 100 is an input end of the strain wave gearing 40 of the second embodiment.

Additionally, the main body 10 is not limited to one monolithic unit as mentioned in the first embodiment and the second embodiment. In other embodiments, the main body 10 of the wave generator 100 could include several components manufactured by powder metallurgy. As illustrated in FIG. 13 to FIG. 17, the wave generator 100 of a third embodiment manufactured by powder metallurgy includes a main body 10, wherein the main body 10 is a porous structure that is manufactured by powder metallurgy. The main body 10 of the wave generator 100 includes a central shaft 12, an elliptically shaped plug 14, and a coupling 16, wherein an outer diameter H3 of the elliptically shaped plug 14 of the main body 10 is in a range of 25 mm to 72 mm, and the strength of the main body 10 allows the main body 10 to bear the torque load less than or equal to 18 Nm.

More specifically, the central shaft 12, the elliptically shaped plug 14, and the coupling 16 are manufactured by powder metallurgy. The voids between the central shaft 12, the elliptically shaped plug 14, and the coupling 16 are filled with lubricating oil, so that the wear and tear of the components manufactured by powder metallurgy during operation of the main body 10 of the wave generator 100 could be prevented. The function of the main body 10 of the wave generator 100 of the third embodiment is as same as that of the first embodiment. The main body 10 of the third embodiment could bear the input torque during the operation of the harmonic strain wave gearing, which overcomes the existing knowledge and bias that the wave generator 100 is required for high strength. With such a design, the manufacturing cost of the wave generator 100 could be significantly reduced and the manufacturing efficiency thereof could be enhanced as well.

The central shaft 12 is a hollowed shaft having a first end and a second end. An outer circumference of the first end of the central shaft 12 is disposed with an engaging bracket 122, and a middle portion of the outer circumference of the central shaft 12 has a positioning groove 124. The engaging bracket 122 has two first slots 123 at opposite sides. The elliptically shaped plug 14 is an annular body, wherein the elliptically shaped plug 14 fits around the circumference of the central shaft 12 and is located between the engaging bracket 122 and the positioning groove 124. A side of the elliptically shaped plug 14 that faces the engaging bracket 122 has two second slots 141 at opposite sides. The coupling 16 is clamped between the engaging bracket 122 and the elliptically shaped plug 14, wherein a side of the coupling 16 has two first blocks 161 at opposite sides, and another side of the coupling 16 has two second blocks 162 at opposite sides. The two first blocks 161 and the two second blocks 162 are arranged staggered in a circumferential direction of the coupling 16, wherein a central angle between each of the first blocks 161 and one of the two second blocks 162 is 90 degrees. The two first blocks 161 are embedded into the two first slots 123. The two second blocks 162 are embedded into the two second slots 141. The positioning groove 124 is engaged with a C-shaped ring 125, wherein the C-shaped ring 125 abuts against a rear side of the elliptically shaped plug 14.

As illustrated in FIG. 13, and FIG. 17 to FIG. 19, when the wave generator 100 of the third embodiment is mounted to the strain wave gearing 40, the elliptically shaped plug 14 is fitted around by a bearing 20. The strain wave gearing 40 includes a circular spline 42, a flex spline 44, and the wave generator 100 of the third embodiment.

The circular spline 42 is a cylindrical tube, wherein a rear side of an inner circumference of the circular spline 42 has internal teeth 422. The circular spline 42 is a fixed end of the strain wave gearing 40. The flex spline 44 is in a cup shape and includes a flexible wall 441 and a side wall 442. The flexible wall 441 is a ring body that is elastic and deformable. The flexible wall 441 is located at an inner side of the circular spline 42. An outer circumference of the flexible wall 441 has a plurality of external teeth 4411. The external teeth 4411 of the flex spline 44 are meshed with the internal teeth 422 of the circular spline 42. The side wall 442 is a circular plate, wherein an edge of the side wall 442 is attached to a front edge of the flexible wall 441. The side wall has a connecting seat 443 in middle, wherein a thickness in an axial direction of the connecting seat 443 is greater than a thickness of the remaining portion of the side wall 442. The connecting seat 443 has a plurality of perforations 444, wherein the perforations 444 are arranged and spaced along a circumferential direction of the connecting seat 443. The wave generator 100 includes the main body 10 and the bearing 20. The bearing 20 abuts against an inner circumference of the flexible wall 441. The central shaft 12 of the main body 10 of the wave generator 100 is an input end of the wave gear 40, and the connecting seat 443 is an output end of the strain wave gearing 40.

As illustrated in FIG. 20 to FIG. 24, a wave generator 100 of the fourth embodiment manufactured by powder metallurgy includes a main body 10. The main body 10 of the wave generator 100 is a porous structure manufactured by powder metallurgy, wherein an outer diameter H4 of the elliptically shaped plug 14 of the main body 10 is in a range of 25 mm to 72 mm. The strength of the main body 10 of the wave generator 100 allows the main body 10 to bear the torque that is smaller than or equal to 18 Nm.

More specifically, the main body 10 of the wave generator 100 includes a central shaft 12, the elliptically shaped plug 14, and a coupling 16. The central shaft 12 is a hollowed shaft having a first end and a second end, wherein an outer circumference of the first end of the central shaft 12 has an engaging bracket 122 that surrounds the outer circumference of the central shaft 12. A middle portion of the outer circumference central shaft 12 has a positioning groove 124 that surrounds the outer circumference central shaft 12. An inner circumference of the central shaft 12 has a keyway 126 extending along an axial direction of the central shaft 12. The engaging bracket 122 has two first slots 123 at opposite sides. The elliptically shaped plug 14 is a ring body that fits around the central shaft 12 and is located between the engaging bracket 122 and the positioning groove 124. A side surface of the elliptically shaped plug 14 that faces the engaging bracket 122 has two second slots 141 at opposite sides. The coupling 16 is clamped between the engaging bracket 122 and the elliptically shaped plug 14. The coupling 16 has two side surfaces that face toward opposite directions. A side surface of the coupling 16 has two first blocks 161 at opposite sides, and an another side surface has two second blocks 162 at opposite sides. The two first blocks 161 are respectively engaged with the two first slots 123, and the two second blocks 162 are respectively engaged with the two second slots 141. A C-shaped ring 125 that abuts against to a rear side of the elliptically shaped plug 14 is engaged with the positioning groove 124.

Figure 20:
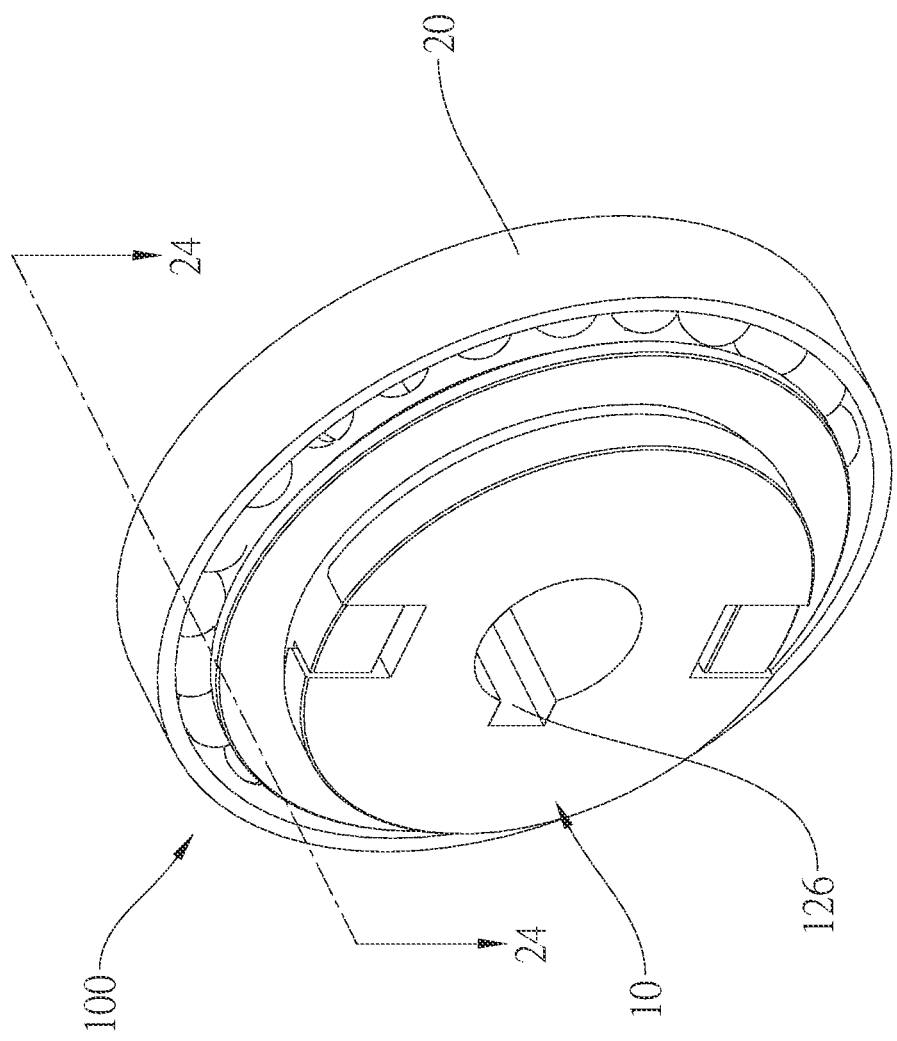
FIG. 20 is a perspective view of the wave generator of a fourth embodiment according to the present invention.
Figure 21:
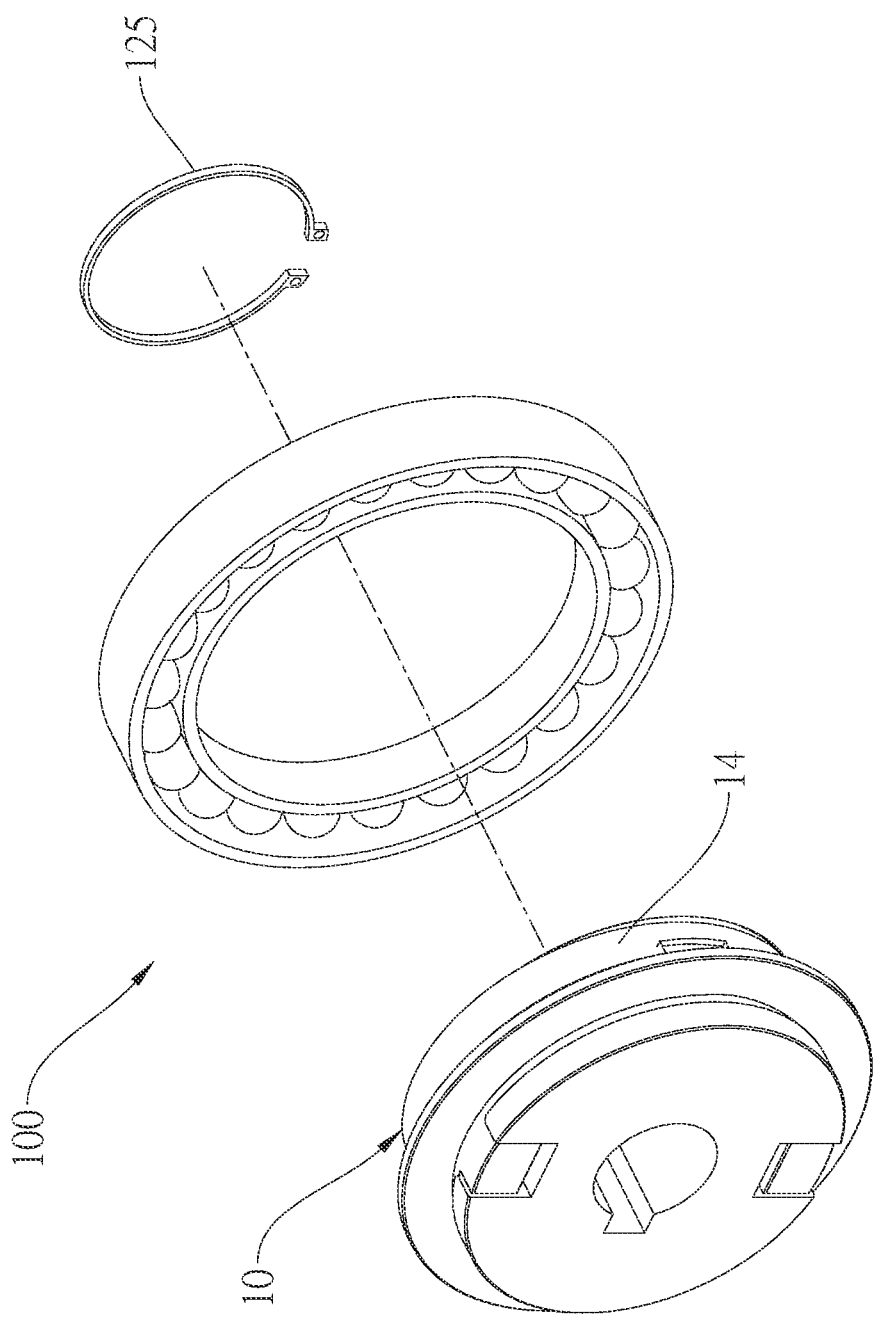
FIG. 21 is an exploded view of the wave generator of the fourth embodiment according to the present invention.
Figure 22:
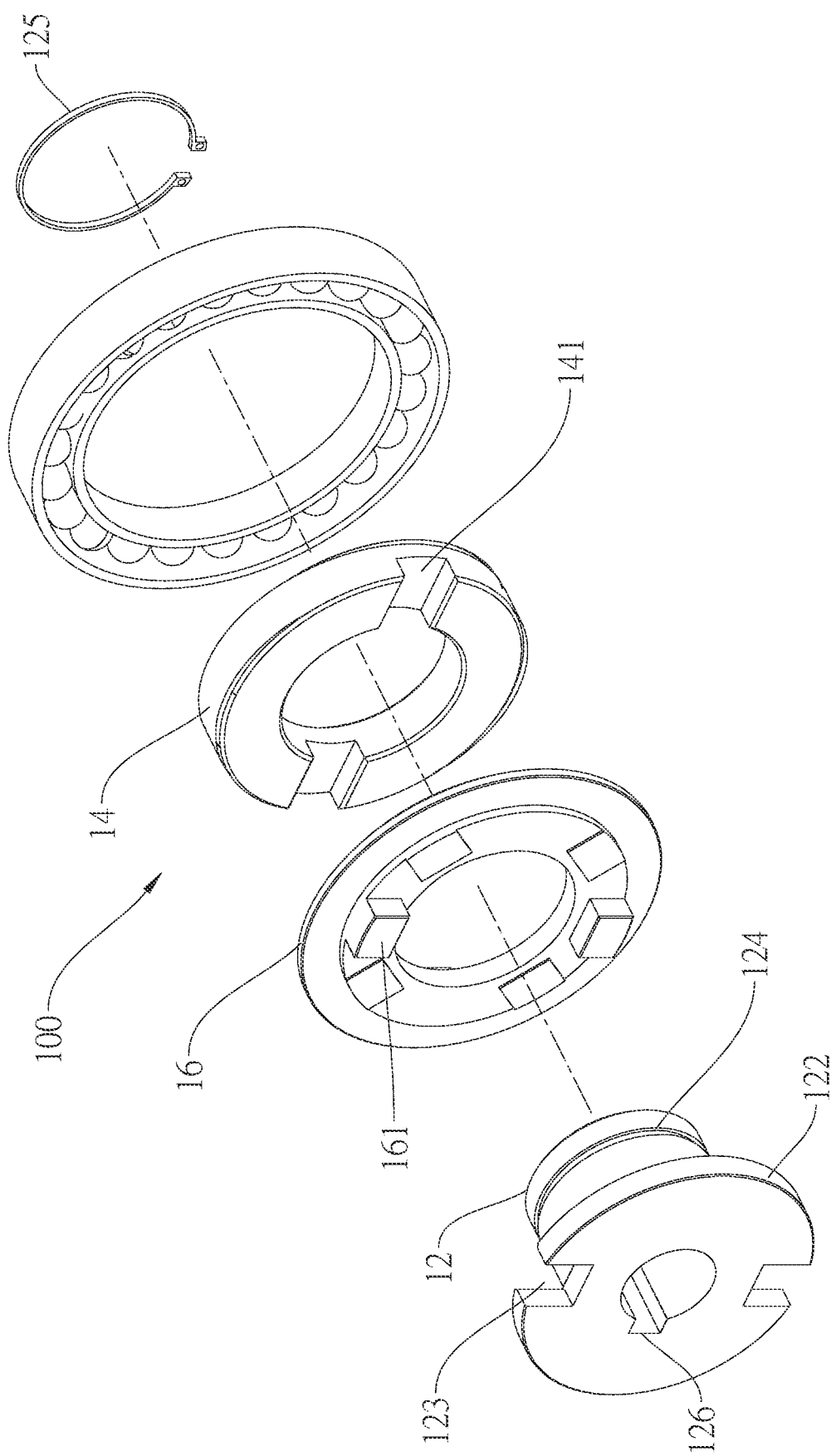
FIG. 22 is an exploded view of the main body of the wave generator in FIG. 21.
Figure 23:
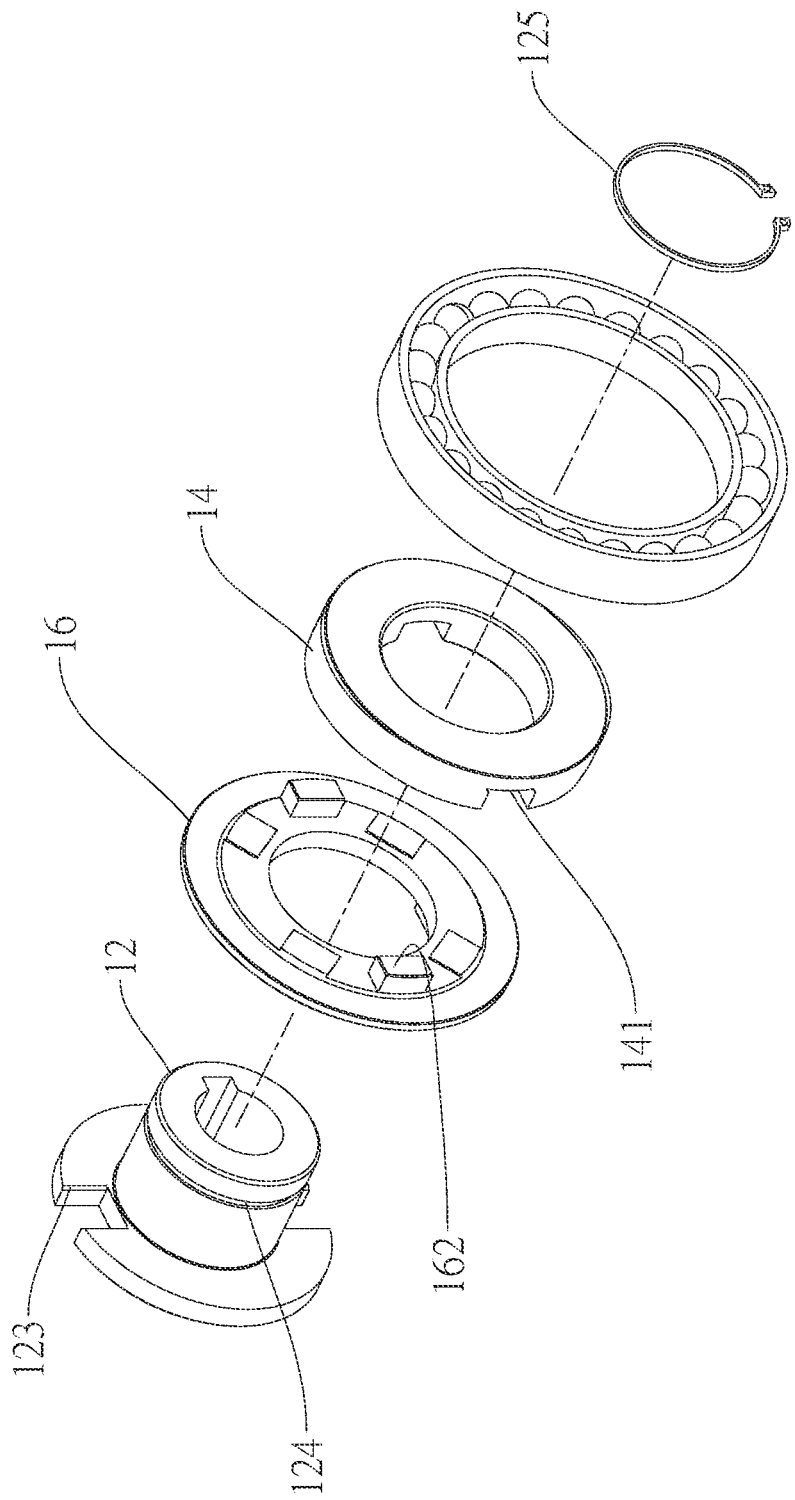
FIG. 23 is an exploded view of the main body of the wave generator in FIG. 21 seen from another perspective.
Figure 24:
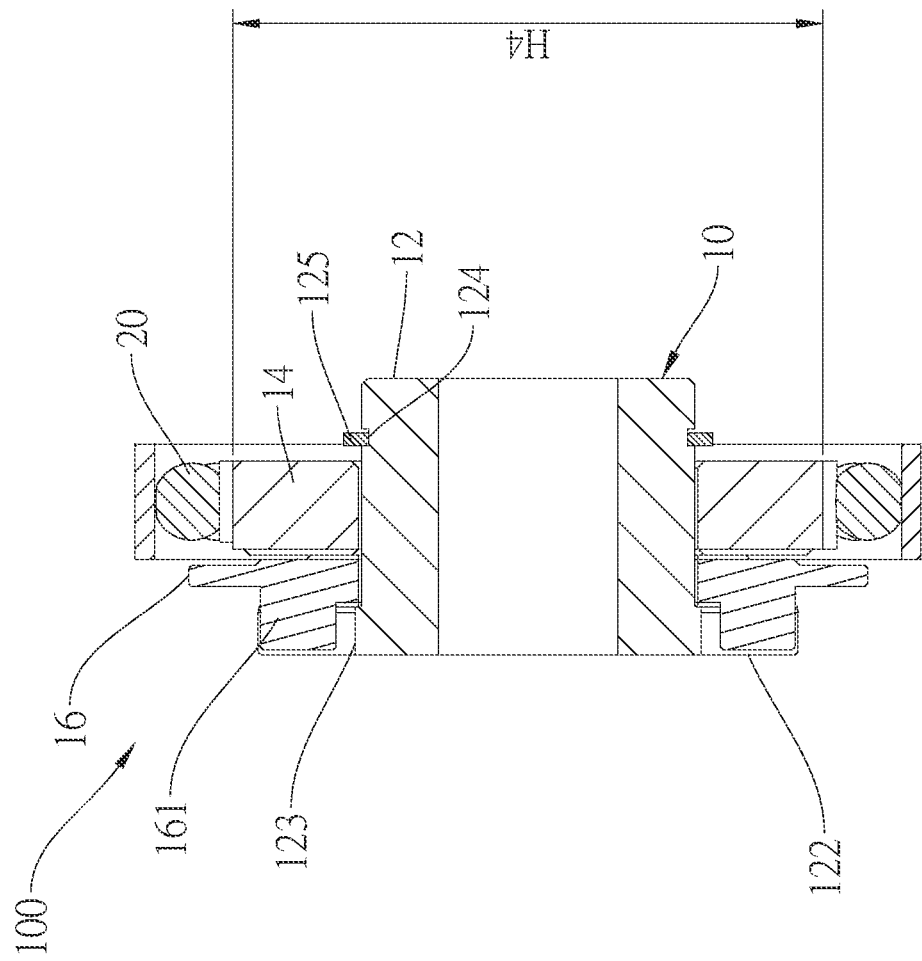
FIG. 24 is a sectional view taken along the 24-24 line in FIG. 20.
Figure 25:
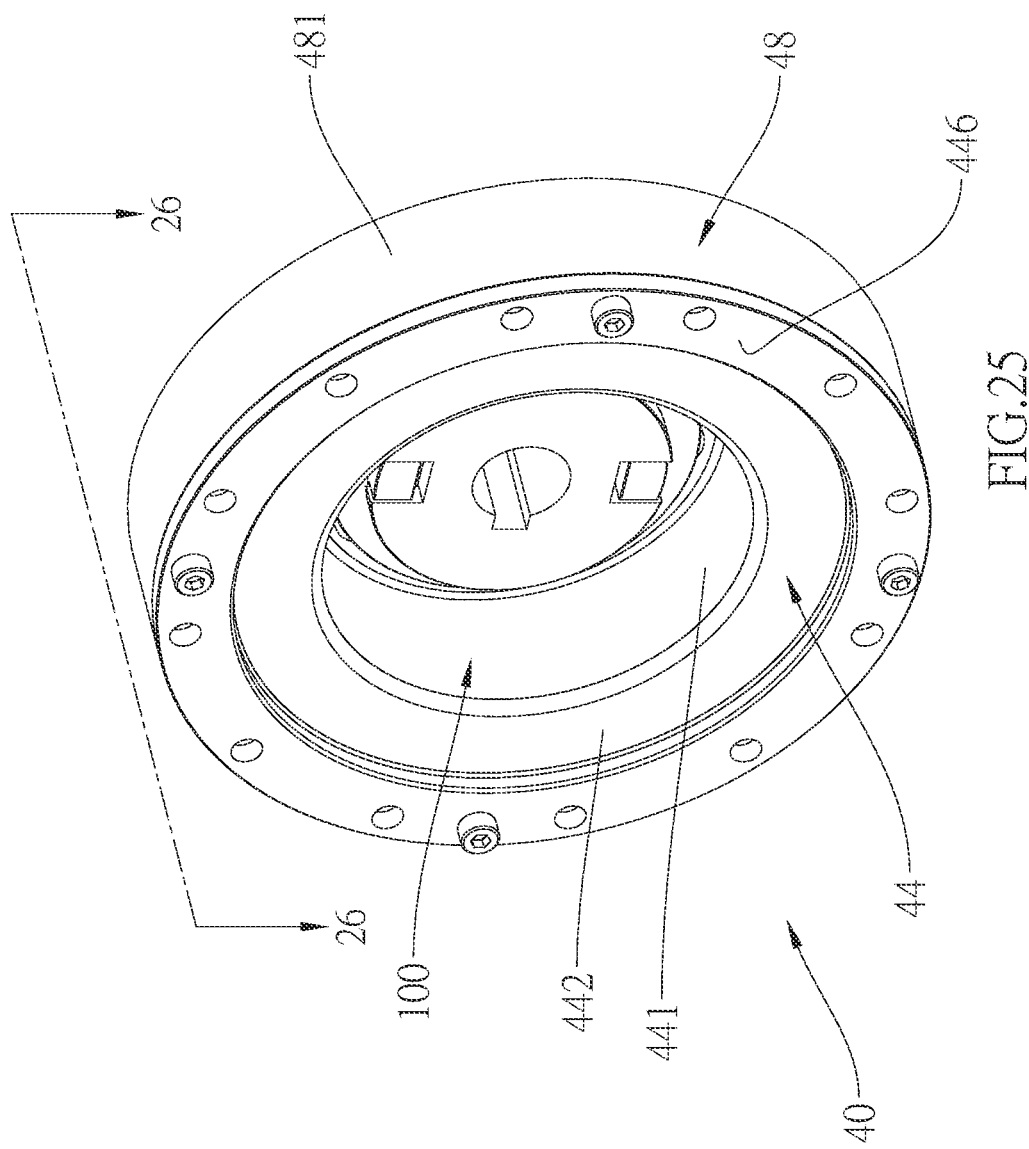
FIG. 25 is a perspective view of the reduction motor assembly with the wave generator of the fourth embodiment according to the present invention.
Figure 26:
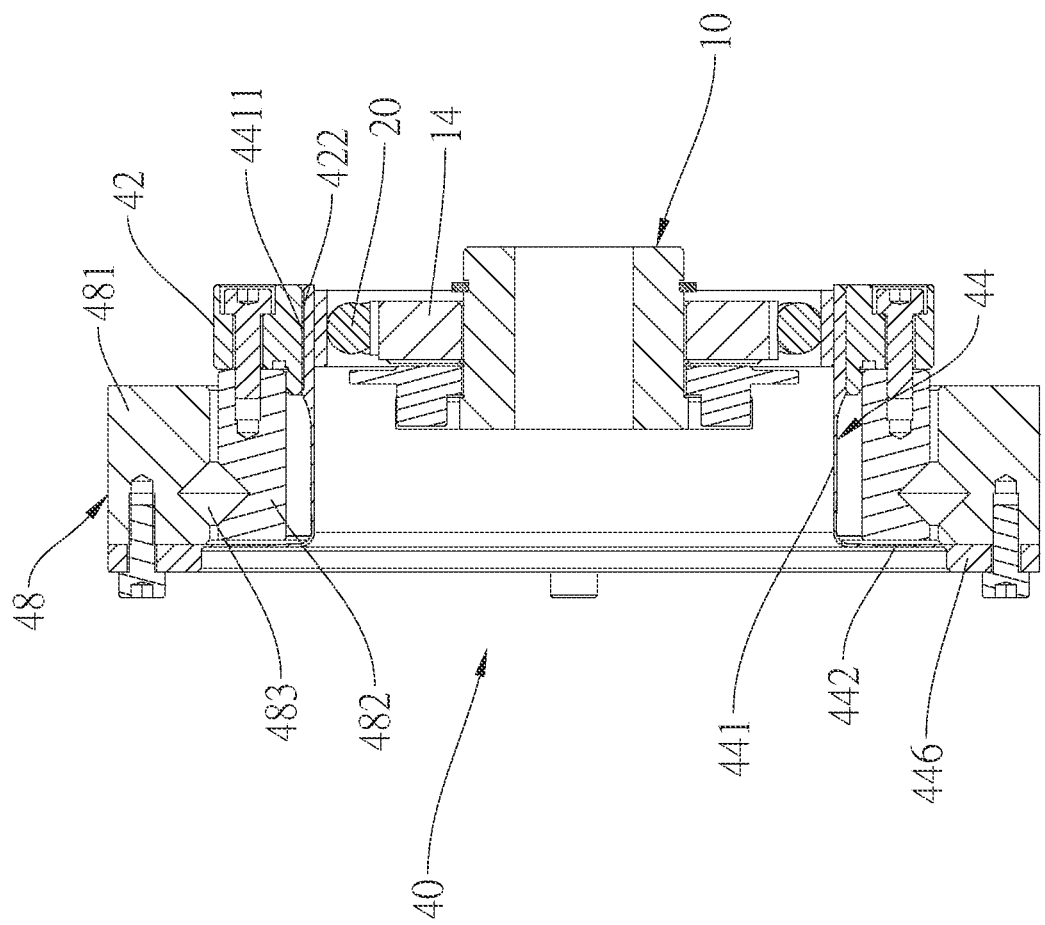
FIG. 26 is a sectional view taken along the 26-26 line in FIG. 25.

As illustrated in FIG. 20 and FIG. 25 to FIG. 26, when the wave generator 100 of the fourth embodiment manufactured by powder metallurgy is mounted in strain wave gearing 40, the elliptically shaped plug 14 is fitted around by a bearing 20. The strain wave gearing 40 includes a circular spline 42, a flex spline 44, and the wave generator 100 of the fourth embodiment.

The circular spline 42 is a ring body, wherein an inner circumference of the circular spline 42 has a plurality of internal teeth 422. The flex spline 44 is in a hat shape and includes a flexible wall 441 and a side wall 442. The flexible wall 441 is an elastic and deformable ring-shaped body, wherein the flexible wall 441 is located at an inner side of the circular spline 42. An outer circumference of the flexible wall 441 has a plurality of external teeth 4411. The external teeth 4411 of the flex spline 44 are meshed with the internal teeth 422 of the circular spline 42. The side wall 442 is a circular plate, wherein an inner edge of the side wall 442 is attached to a rear edge of the flexible wall 441. An outer edge of the side wall 442 has a connecting portion 446.

The cross roller bearing 48 is disposed between the side wall 442 and the circular spline 42. The cross roller bearing 48 includes an outer ring 481, an inner ring 482, and a plurality of rollers 483, wherein the rollers 483 are disposed between the outer ring 481 and the inner ring 482. The outer ring 481 is engaged with the connecting portion 446 is a fixed end of the strain wave gearing 40. The inner ring 482 is engaged with a rear side of the circular spline 42, and the circular spline 42 is an output end of the strain wave gearing 40. The wave generator 100 includes the main body 10 and the bearing 20. The bearing 20 abuts against the inner surface of the flexible wall 441. The central shaft 12 of the main body 10 is an input end of the strain wave gearing 40.

It must be pointed out that the embodiment described above is only a preferred embodiment of the present invention. All equivalent structures and methods which employ the concepts disclosed in this specification and the appended claims should fall within the scope of the present invention.

What is claimed is:

1. A wave generator manufactured by powder metallurgy, comprising:
a main body, which is a porous structure manufactured by powder metallurgy, wherein the main body comprises a central shaft and an elliptically shaped plug that is disposed on a circumference of the central shaft and surrounds the central shaft; an outer diameter of the elliptically shaped plug is in a range of 25 mm to 72 mm, and the main body has a bearable torque that is less than or equal to 18 Nm;
wherein the central shaft has a first end and a second end; an outer circumference of the first end of the central shaft is disposed with an engaging bracket, and the engaging bracket surrounds the outer circumference of the central shaft; the engaging bracket has two first slots at opposite sides; the elliptically shaped plug is a ring body that fits around the outer circumference of the central shaft, and a side surface of the elliptically shaped plug that faces the engaging bracket has two second slots at two opposite sides; a coupling is clamped between the engaging bracket and the elliptically shaped plug; a side of the coupling has two first blocks at opposite sides, and another side of the coupling has two second blocks at opposite sides; the two first blocks are respectively engaged with the two first slots, and the two second blocks are respectively engaged with the two second slots.

2. The wave generator as claimed in claim 1, wherein the central shaft is a rod body having the first end and the second end, the elliptically shaped plug is connected to the first end of the central shaft to surround the circumference of the central shaft; a middle portion of the circumference of the central shaft forms a rotor seat for mounting a rotor of a motor.

3. The wave generator as claimed in claim 1, wherein the central shaft, the elliptically shaped plug, and the coupling are porous structures that are manufactured by powder metallurgy, and voids of the porous structures are filled with lubricating oil.

4. The wave generator as claimed in claim 1, wherein a circumference of the elliptically shaped plug is fitted around by a bearing.

5. A strain wave gearing for a harmonic reducer, comprising:
- a circular spline having a plurality of internal teeth on an inner circumference;
- a flex spline comprising a flexible wall and a side wall, wherein an outer circumference of the flexible wall has a plurality of external teeth; the plurality of external teeth are meshed with the plurality of internal teeth of the circular spline; the side wall is connected to an edge of the flexible wall; and
- a wave generator comprising a main body and a bearing, wherein the wave generator is a porous structure manufactured by powder metallurgy; the main body comprises a central shaft and an elliptically shaped plug that is disposed on a circumference of the central shaft and surrounds the central shaft; an outer diameter of the elliptically shaped plug is in a range of 25 mm to 72 mm, and the main body has a bearable torque that is less than or equal to 18 Nm; the bearing is disposed on a circumference of the elliptically shaped plug; the bearing abuts against an inner circumference of the flexible wall;
- wherein the side wall is a circular plate, and an edge of the side wall is attached to an edge of the flexible wall; the side wall has a connecting seat at a middle portion; a thickness in an axial direction of the connecting seat is greater than a thickness of a remaining portion of the side wall; a plurality of perforations are arranged on the connecting seat; a fixed end of the strain wave gearing is the circular spline; an input end of the strain wave gearing is the central shaft; an output end of the strain wave gearing is the connecting seat.

6. The strain wave gearing as claimed in claim 5, wherein the central shaft is a rod body having a first end and a second end, the elliptically shaped plug is connected to the first end of the central shaft to surround the circumference of the central shaft; a middle portion of the circumference of the central shaft forms a rotor seat for mounting a rotor of a motor.

7. The strain wave gearing as claimed in claim 5, wherein the central shaft has a first end and a second end; an outer circumference of the first end of the central shaft is disposed with an engaging bracket, and the engaging bracket surrounds the outer circumference of the central shaft; the engaging bracket has two first slots at opposite sides; the elliptically shaped plug is a ring body that fits around the outer circumference of the central shaft, and a side surface of the elliptically shaped plug that faces the engaging bracket has two second slots at two opposite sides; a coupling is clamped between the engaging bracket and the elliptically shaped plug; a side of the coupling has two first blocks at opposite sides, and another side of the coupling has two second blocks at opposite sides; the two first blocks are respectively engaged with the two first slots, and the two second blocks are respectively engaged with the two second slots.

8. The strain wave gearing as claimed in claim 7, wherein the central shaft, the elliptically shaped plug, and the coupling are porous structures that manufactured by powder metallurgy, and voids of the porous structures are filled with lubricating oil.

9. A strain wave gearing for a harmonic reducer, comprising:
- a circular spline having a plurality of internal teeth on an inner circumference;
- a flex spline comprising a flexible wall and a side wall, wherein an outer circumference of the flexible wall has a plurality of external teeth; the plurality of external teeth are meshed with the plurality of internal teeth of the circular spline; the side wall is connected to an edge of the flexible wall; and
- a wave generator comprising a main body and a bearing, wherein the wave generator is a porous structure manufactured by powder metallurgy; the main body comprises a central shaft and an elliptically shaped plug that is disposed on a circumference of the central shaft and surrounds the central shaft; an outer diameter of the elliptically shaped plug is in a range of 25 mm to 72 mm, and the main body has a bearable torque that is less than or equal to 18 Nm; the bearing is disposed on a circumference of the elliptically shaped plug; the bearing abuts against an inner circumference of the flexible wall;
- wherein the side wall is a circular plate; an inner edge of the side wall is attached to an edge of the flexible wall; an outer edge of the side wall has a connecting portion; a cross roller bearing is disposed between the side wall and the circular spline, wherein the cross roller bearing comprises an outer ring, an inner ring, and a plurality of rollers disposed between the outer ring and the inner ring; the outer ring is engaged with the connecting portion, and the inner ring is engaged with the circular spline; a fixed end of the strain wave gearing is the outer ring; an input end of the strain wave gearing is the central shaft; an output end of the strain wave gearing is the circular spline.

* * * * *